(12) United States Patent
Oobuchi et al.

(10) Patent No.: US 10,547,902 B2
(45) Date of Patent: Jan. 28, 2020

(54) INFORMATION PROCESSING APPARATUS AND METHOD, DISPLAY CONTROL APPARATUS AND METHOD, REPRODUCING APPARATUS AND METHOD, AND INFORMATION PROCESSING SYSTEM

(71) Applicant: SONY CORPORATION, Tokyo (JP)

(72) Inventors: Yukio Oobuchi, Kanagawa (JP); Yuichi Hasegawa, Tokyo (JP); Yuki Yamamoto, Chiba (JP)

(73) Assignee: SONY CORPORATION, Tokyo (JP)

( * ) Notice: Subject to any disclaimer, the term of this patent is extended or adjusted under 35 U.S.C. 154(b) by 6 days.

(21) Appl. No.: 15/323,289

(22) PCT Filed: Jul. 6, 2015

(86) PCT No.: PCT/JP2015/069382
§ 371 (c)(1),
(2) Date: Dec. 30, 2016

(87) PCT Pub. No.: WO2016/009865
PCT Pub. Date: Jan. 21, 2016

(65) Prior Publication Data
US 2017/0150218 A1  May 25, 2017

(30) Foreign Application Priority Data
Jul. 18, 2014  (JP) .................. 2014-147597

(51) Int. Cl.
| | |
|---|---|
| *H04N 21/442* | (2011.01) |
| *H04N 21/234* | (2011.01) |
| *H04N 21/2668* | (2011.01) |
| *G06K 9/00* | (2006.01) |
| *H04N 21/2187* | (2011.01) |
| *H04N 21/4223* | (2011.01) |

(Continued)

(52) U.S. Cl.
CPC ... *H04N 21/44218* (2013.01); *G06K 9/00718* (2013.01); *H04N 21/2187* (2013.01);
(Continued)

(58) Field of Classification Search
None
See application file for complete search history.

(56) References Cited

U.S. PATENT DOCUMENTS

2010/0009809 A1* 1/2010 Carrington ......... A63B 71/0622
482/4
2012/0155671 A1    6/2012 Suzuki
(Continued)

FOREIGN PATENT DOCUMENTS

| EP | 2685733 A1 | 1/2014 |
|---|---|---|
| JP | 2012-129800 A | 7/2012 |

(Continued)

OTHER PUBLICATIONS

International Search Report and Written Opinion of PCT Application No. PCT/JP2015/069382, dated Sep. 29, 2015, 6 pages of English Translation and 6 pages of ISRWO.

(Continued)

*Primary Examiner* — Justin E Shepard
(74) *Attorney, Agent, or Firm* — Chip Law Group

(57) ABSTRACT

The present technology relates to an information processing apparatus and method, a display control apparatus and method, a reproducing apparatus and method, a program, and an information processing system that transmit a response of viewers acquired in a more natural way to a place where content is captured, enabling presentation in an easier-to-see way. The information processing apparatus of one aspect of the present technology receives motion information indicating motions of users watching video content and information indicating attributes of the users, and generates an excitement image by arranging information visually indicating a degree of excitement of each user determined on the basis of the motion information transmitted from a plurality of reproducing apparatuses at a position according to an attribute of each user. The present technol- (Continued)

ogy is applicable to a server that processes information transmitted from the reproducing apparatuses of content distributed in real time via a network.

18 Claims, 23 Drawing Sheets

(51) Int. Cl.
H04N 21/431 (2011.01)
H04N 21/44 (2011.01)
(52) U.S. Cl.
CPC ....... *H04N 21/234* (2013.01); *H04N 21/2668* (2013.01); *H04N 21/4223* (2013.01); *H04N 21/4312* (2013.01); *H04N 21/44008* (2013.01)

(56) References Cited

U.S. PATENT DOCUMENTS

2012/0330659 A1* 12/2012 Nakadai .................. G10L 21/06
704/235
2013/0014139 A1 1/2013 Kawakami et al.
2013/0322843 A1* 12/2013 Suzuki ................. G11B 27/322
386/230
2013/0336631 A1 12/2013 Kura
2014/0335893 A1* 11/2014 Ronen ................... G01S 5/0252
455/456.1

FOREIGN PATENT DOCUMENTS

| | | |
|---|---|---|
| JP | 2012-186659 A | 9/2012 |
| JP | 2013-021466 A | 1/2013 |
| JP | 2013-258555 A | 12/2013 |
| WO | 2012/121128 A1 | 9/2012 |

OTHER PUBLICATIONS

International Preliminary Report on Patentability of PCT Application No. PCT/JP2015/069382, dated Feb. 2, 2017, 6 pages of English Translation and 3 pages of IPRP.

* cited by examiner

*FIG. 10*

USER ATTRIBUTE INFORMATION

· LOCATION INFORMATION (DISTRICT UNIT)
· FAVORITE INFORMATION
· VISUAL FIELD INFORMATION

FIG. 23

INFORMATION PROCESSING APPARATUS AND METHOD, DISPLAY CONTROL APPARATUS AND METHOD, REPRODUCING APPARATUS AND METHOD, AND INFORMATION PROCESSING SYSTEM

CROSS REFERENCE TO RELATED APPLICATIONS

This application is a U.S. National Phase of International Patent Application No. PCT/JP2015/069382 filed on Jul. 6, 2015, which claims priority benefit of Japanese Patent Application No. JP 2014-147597 filed in the Japan Patent Office on Jul. 18, 2014. Each of the above-referenced applications is hereby incorporated herein by reference in its entirety.

TECHNICAL FIELD

The present technology relates to an information processing apparatus and method, a display control apparatus and method, a reproducing apparatus and method, a program, and an information processing system, and in particular to an information processing apparatus and method, a display control apparatus and method, a reproducing apparatus and method, a program, and an information processing system that transmit a response of viewers acquired in a more natural way to a place where capturing of content is performed, enabling presentation in an easier-to-see way.

BACKGROUND ART

In recent years, various services to distribute moving pictures of concerts or sport games in real time have been provided. Viewers can watch content of the moving pictures distributed from a server by using their terminals such as PCs and smartphones.

There is also a technology to transmit a reaction of viewers who are watching content via the Internet to a venue and to present the reaction to spectators or the like who are in the venue.

CITATION LIST

Patent Document

Patent Document 1: Japanese Patent Application Laid-Open No. 2005-339479
Patent Document 2: Japanese Patent Application Laid-Open No. 2011-182109

SUMMARY OF THE INVENTION

Problems to be Solved by the Invention

In the above-described technology, the viewers of the content need to take, so to speak, active operations such as pushing buttons displayed on terminals used for watching the content in order to transmit their reaction to the venue. Therefore, sending the reaction causes an obstruction to being absorbed in watching the content.

The present technology has been made in view of such a situation and aims to transmit a response of the viewers acquired in a more natural way to a place where capturing of the content is performed, and to enable presentation in an easier-to-see way.

Solutions to Problems

An information processing apparatus according to a first aspect of the present technology includes: a receiving unit configured to receive motion information indicating a motion of a user who is watching video content and information indicating an attribute of the user transmitted from a reproducing apparatus that receives and reproduces the real time video content with a display range switched following the motion of the user who is a viewer within a range of a captured entire video; a generation unit configured to generate an excitement image by arranging information that visually indicates a degree of excitement of each of the users determined on the basis of the motion information transmitted from the plurality of reproducing apparatuses at a position according to the attribute of each of the users; and a transmitting unit configured to transmit data of the excitement image to a display control apparatus that causes a display apparatus installed in space where capturing of the video of the video content is performed to display the excitement image.

A display control apparatus according to a second aspect of the present technology includes: a receiving unit configured to receive motion information indicating a motion of a user who is watching video content and information indicating an attribute of the user transmitted from a reproducing apparatus that receives and reproduces the real time video content with a display range switched following the motion of the user who is a viewer within a range of a captured entire video, and to receive data of an excitement image transmitted from an information processing apparatus that generates the excitement image by arranging information that visually indicates a degree of excitement of each of the users determined on the basis of the motion information transmitted from the plurality of reproducing apparatuses at a position according to the attribute of each of the users; and a display control unit configured to cause a display apparatus installed in space where capturing of the video of the video content is performed to display the excitement image on the basis of the data of the excitement image.

A reproducing apparatus according to a third aspect of the present technology includes: a receiving unit configured to receive real time video content with a display range switched following a motion of a user who is a viewer within a range of a captured entire video; a reproducing unit configured to reproduce the video content; a detection unit configured to detect the motion of the user; a display unit configured to display the video of the display range according to the motion of the user; and a transmitting unit configured to transmit motion information indicating the motion of the user who is watching the video content to an information processing apparatus that aggregates the motion information together with information indicating an attribute of the user.

Effects of the Invention

The present technology enables transmission of the response of the viewers acquired in a more natural way to the place where capturing of the content is performed, and enables presentation in an easier-to-see way.

It is to be noted that effects described here may not necessarily be limited, and may be any effect described in the present disclosure.

BRIEF DESCRIPTION OF DRAWINGS

FIG. 10 is a diagram illustrating an example of information included in user attribute information.

FIG. 23 is a diagram illustrating an example of arrangement of information indicating a degree of excitement.

MODE FOR CARRYING OUT THE INVENTION

Hereinafter, a form for implementing the present technology will be described. The description is made in the following order.

1. Configuration of information processing system
2. Configuration of each device
3. Operation of each device
4. Example of heat map image
5. Variations <Configuration of Information Processing System>

Figure 1:
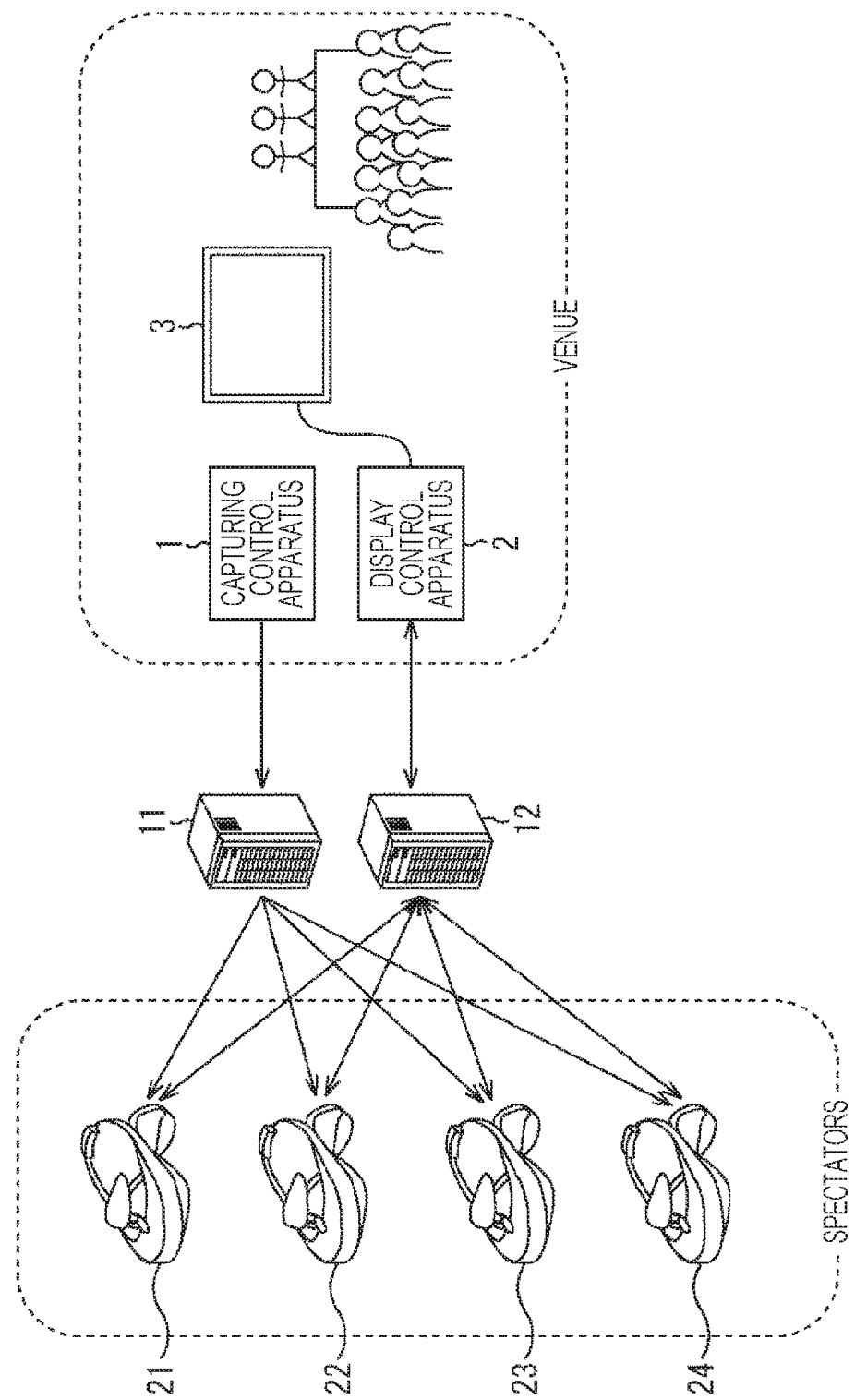
FIG. 1 is a diagram illustrating a configuration example of an information processing system according to one embodiment of the present technology.

FIG. 1 is a diagram illustrating a configuration example of an information processing system according to one embodiment of the present technology.

The information processing system of FIG. 1 is a system that distributes moving pictures obtained by capturing concerts, sport games, and the like in real time.

The information processing system of FIG. 1 includes apparatuses on an event venue side where a concert or the like is held, a distribution server 11, an aggregation server 12, and head mounted displays (HMDs) 21 to 24 used by viewers of live content.

While FIG. 1 illustrates four HMDs as client terminals, more client terminals may be provided. It is also possible that the distribution server 11 and the aggregation server 12 are installed in the event venue. In addition, it is also possible to implement functions of the distribution server 11 and the aggregation server 12 with one server. Respective apparatuses are connected via a network such as the Internet.

A capturing control apparatus 1, a display control apparatus 2, and a large display 3 are provided in the event venue. In the example of FIG. 1, a concert is held in the event venue, and three persons as performers and spectators of the concert are in the event venue. The large display 3 is installed at a position both the performers and the spectators can see.

The capturing control apparatus 1 controls cameras installed in the event venue and controls capturing of the concert. The capturing control apparatus 1 transmits a captured moving picture to the distribution server 11 over the network.

The distribution server 11 generates live content for distribution on the basis of the moving picture transmitted from the capturing control apparatus 1, and then transmits the live content to the HMDs 21 to 24. The live content transmitted from the distribution server 11 is, for example, content including videos captured at a plurality of positions with an angle of view in at least one of a horizontal direction and a vertical direction being 360 degrees.

For example, a user of the HMD 21 who receives the live content transmitted from the distribution server 11 can select a visual point and watch the video from the selected visual point while changing a visual field. The live content transmitted from the distribution server 11 is so-called free visual point content with a changeable visual point.

Each of the HMDs 21 to 24 is equipped with a sensor for head tracking, such as an acceleration sensor and an angular velocity sensor. Each of the HMDs 21 to 24 detects a posture of a head of the user wearing each of the HMDs 21 to 24, and then switches a display range of the video according to a direction of a line of sight guessed from the posture of the head. Of the entire angle of view of 360 degrees, the user will see a certain range of the video that is in a direction in which the user faces.

Here, "the visual point" is a standpoint of the user who sees an object. Also, "the visual field" is a range the user sees, and corresponds to the range of video displayed on a display (display range). "The line of sight" is a direction of the user's visual field, and corresponds to a direction of the display range of the video on the basis of a predetermined direction in capturing space.

Figure 2:
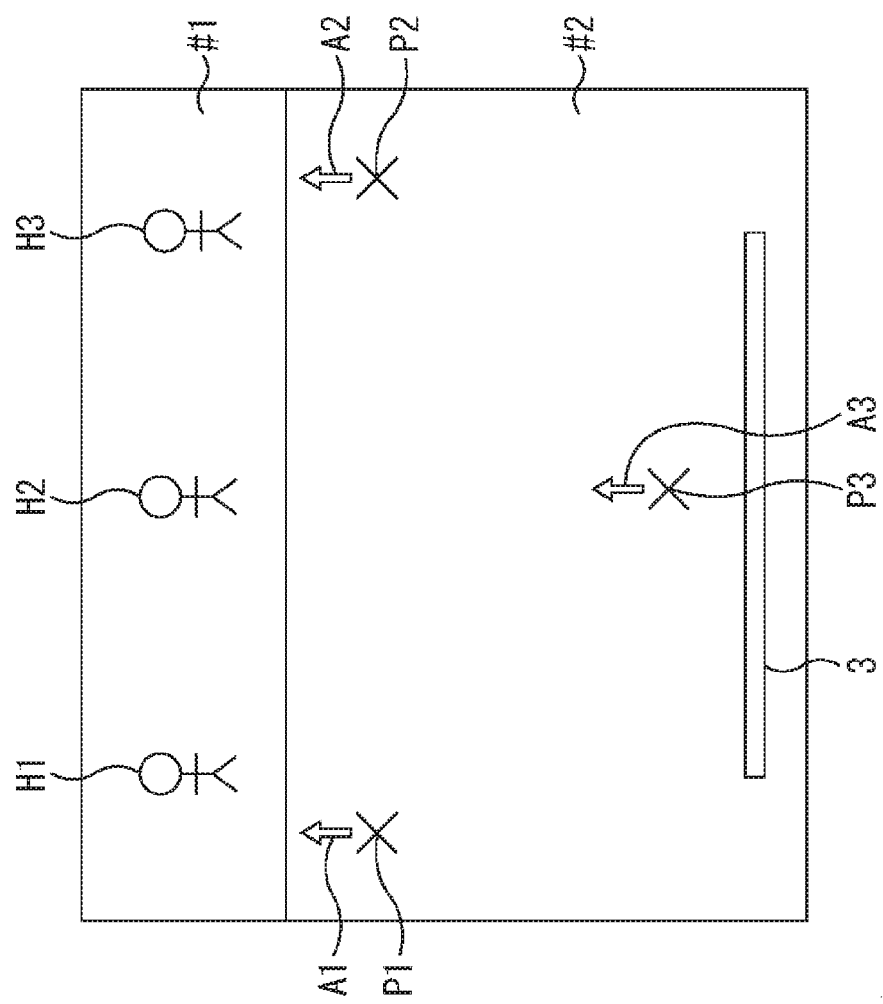
FIG. 2 is a plan view illustrating an example of an event venue.

FIG. 2 is a plan view illustrating an example of the event venue.

A stage #1 is provided in the event venue, and a spectator floor #2 is provided ahead of the stage #1 (in a lower part of FIG. 2). Three singers of persons H1, H2, and H3 are on the stage #1. In addition, a lot of spectators are in the spectator floor #2, behind which is installed the large display 3. A subject is a scene of the entire event venue.

Positions P1 to P3 are capturing positions of videos. At each of the positions P1 to P3 is installed a camera capable of capturing a video with an angle of view in at least one of the horizontal direction and vertical direction being 360 degrees. By installation of a plurality of cameras with different capturing ranges at respective capturing positions and composition of the videos captured by the cameras, a video with the capturing positions of the positions P1 to P3 and the angle of view of 360 degrees may be generated.

Hollow arrows A1 to A3 indicate reference directions at the positions of the positions P1 to P3, respectively. In the example of FIG. 2, the direction of the stage #1 is the reference direction.

Figure 3:
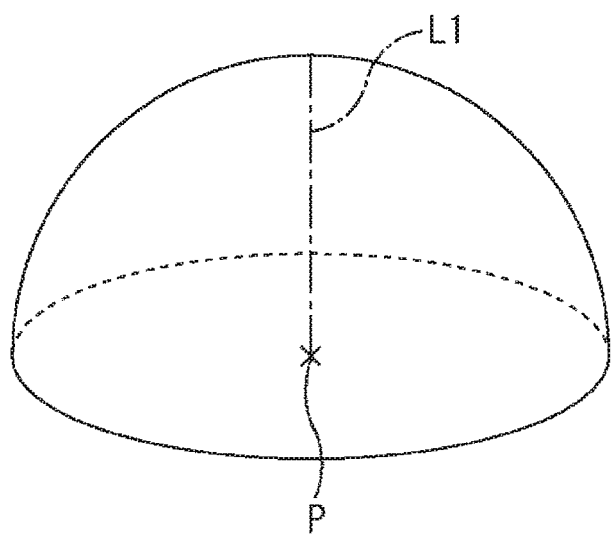
FIG. 3 is a diagram illustrating an example of an angle of view of a video.

FIG. 3 is a diagram illustrating an example of the angle of view of the videos to be captured at the positions P1 to P3.

For example, when a wide-angle lens is pointed at right above at each of the positions P1 to P3 and capturing is performed, as illustrated in FIG. 3, the video of a half celestial sphere range is captured in which an optical axis L1 illustrated in alternate long and short dash line crosses a zenith. The angle of view of FIG. 3 is an angle of view of 360 degrees in the horizontal direction and 180 degrees in the vertical direction.

Figure 4:
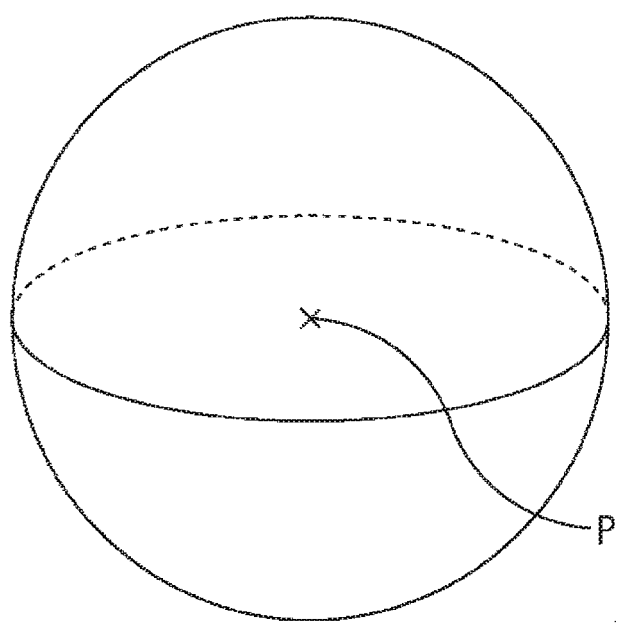
FIG. 4 is a diagram illustrating another example of the angle of view of the video.

As illustrated in FIG. 4, the video of an entire celestial sphere range with the angle of view in both horizontal direction and vertical direction of 360 degrees may be captured at each of the positions P1 to P3. Here, when represented in latitude/longitude using equidistant cylindrical projection, the video of the entire celestial sphere range may be represented as 360 degrees in the horizontal direction and 180 degrees in the vertical direction; here, in order to distinguish from the half celestial sphere range of FIG. 3, the angle of view in both horizontal direction and vertical direction are 360 degrees.

For convenience of description, the following describes a case where the video captured at each of the positions P1 to P3 is the video of the half celestial sphere range illustrated in FIG. 3.

Figure 5A:
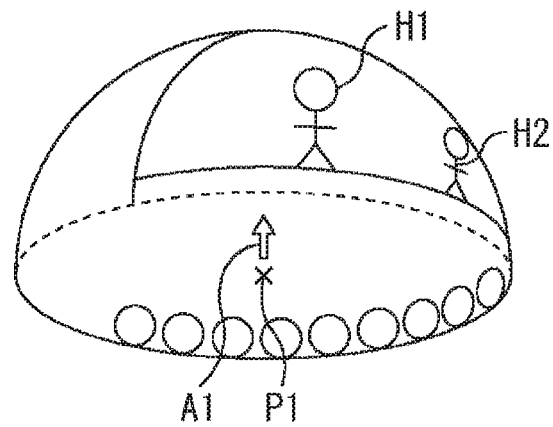
FIGS. 5A, 5B and 5C are diagram illustrating an example of the video.
Figure 5B:
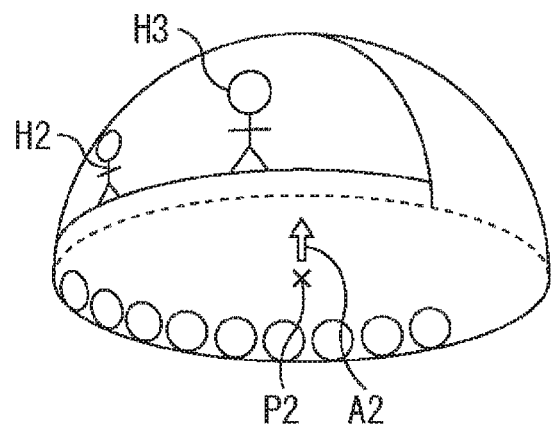
Figure 5C:
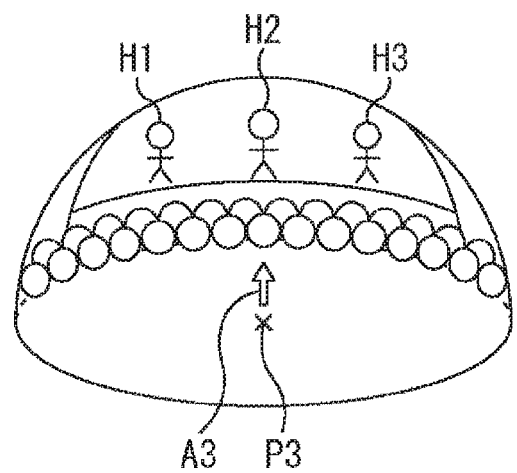

FIGS. 5A, 5B and 5C are diagrams illustrating examples of the videos captured at the positions P1 to P3, respectively.

The half celestial spheres of FIGS. 5A, 5B and 5C indicate the entire videos of one frame of the moving pictures captured at the positions P1 to P3, respectively.

As illustrated in FIG. 5A, at the position P1, the moving picture is captured in which the person H1 is reflected large in the direction of the stage #1 indicated by the hollow arrow A1, and the person H2 is reflected smaller than the person H1 on a right side of the person H1. The person H3 will be reflected still smaller on a right side of the person H2. The spectators who face the direction of the stage #1 are reflected in the opposite direction of the stage #1.

As illustrated in FIG. 5B, at the position P2, the moving picture is captured in which the person H3 is reflected large in the direction of the stage #1 indicated by the hollow arrow A2, and the person H2 is reflected smaller than the person H3 on a left side of the person H3. The person H1 will be reflected still smaller on a left side of the person H2. The spectators who face the direction of the stage #1 are reflected in the opposite direction of the stage #1.

As illustrated in FIG. 5C, at the position P3, the moving picture is captured in which the entire stage #1 is reflected on a far side in the direction indicated by the hollow arrow A3, and on a near side thereof, back sight of the spectators who face the direction of the stage #1 is reflected. Although illustration is omitted, the large display 3 is reflected on an opposite side of the spectators.

Figure 6:
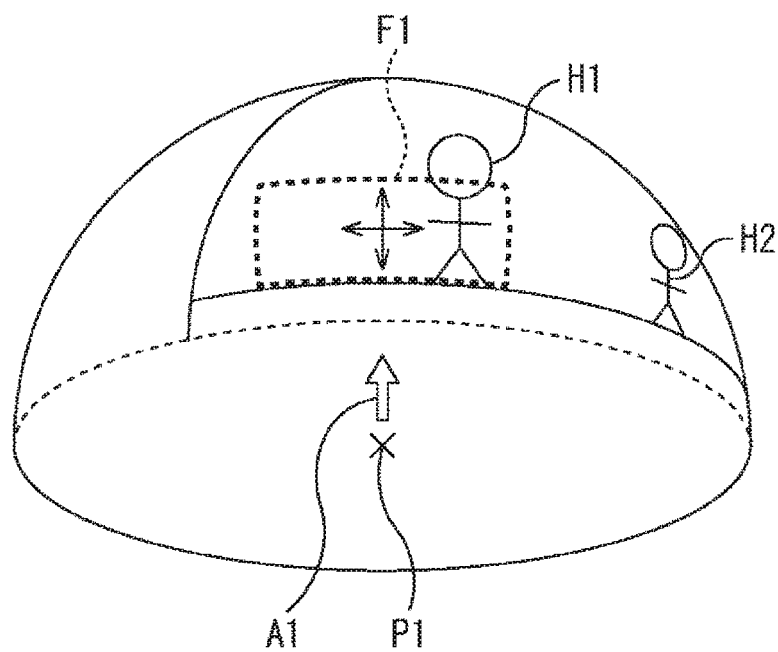
FIG. 6 is a diagram illustrating an example of a visual field.

FIG. 6 is a diagram illustrating an example of the visual field at the position P1.

A range of a frame F1 illustrated in dashed line on a surface of a sphere of FIG. 6 indicates, for example, the display range of the HMD 21, that is, the visual field of the user of the HMD 21. In the HMD 21, an image within the range indicated by the frame F1 is cut out from each frame and is displayed as a moving picture.

In response to the user moving the head, the frame F1 moves as indicated by arrows, and the range displayed on the display of the HMD 21 is also switched. A shape and size of the frame indicating the range of the visual field will change according to an aspect ratio and viewing angle of the display included in each client terminal. The visual field of the user is specified by a position (coordinate) of the position P1 in the capturing space, the direction of the frame F1 with respect to the reference direction, and the angle of view of the frame F1.

It is to be noted that the description here assumes that the number of visual points is three; however, the number of visual points may be one and may be four or more. The live content distributed from the distribution server 11 includes a video stream of the video captured from one or more visual points. According to the visual point selected by the user, the video stream reproduced in the client terminal is switched.

Also, content of full free visual point generated by composition of videos captured at a plurality of positions may be distributed from the distribution server 11. The content of full free visual point is content that allows selection of any position in the capturing space as the visual point.

Returning to description of FIG. 1, the HMDs 21 to 24 each reproduce the live content transmitted from the distribution server 11. The users of the HMDs 21 to 24 who are provided with the live content can also see the scene almost identical to the scene the spectators in the event venue see.

The HMDs 21 to 24 each reproduce the live content and then cause a built-in display to display the video of the visual point selected by the user. The HMDs 21 to 24 are each a so-called immersive HMD, and project the video in front of eyes of the user who wears a body.

The HMDs 21 to 24 each detect a posture of the user's head during reproduction of the live content, and switch the display range of the video according to the posture of the head. As described with reference to FIG. 6, for example, when the user turns face rightward, the HMDs 21 to 24 each move the display range of the video rightward while keeping the position of the visual point as it is, and when the user turns face leftward, the HMDs 21 to 24 each move the display range of the video leftward while keeping the position of the visual point as it is.

In addition, during reproduction of the live content, the HMDs 21 to 24 each detect a motion of the user on the basis of output from the acceleration sensor or angular velocity sensor. For example, the HMDs 21 to 24 each detect a plurality of types of user motion, such as a degree to which the user is swinging the head up and down, a degree to which the user is swaying the body, and whether the user is raising an arm.

The HMDs 21 to 24 each transmit motion information indicating the motion of the user who is watching the live content to the aggregation server 12 together with information indicating an attribute of the user. Vital signs including a pulse, a heart rate, a body temperature, and other signs of the user who is watching the live content detected by a sensor the user wears on the body is also added to the motion information. As will be described later, the user attribute includes rough positional information on the user, such as a position in district unit.

It can be said that the motion of the user while watching the live content indicates a degree of excitement of the user. Thus, the information processing system of FIG. 1 will acquire the degree of excitement of the user in a natural way without causing the user to perform active operations such as operating a button.

The aggregation server 12 receives the motion information and the user attribute information transmitted from the HMDs 21 to 24, and then aggregates the degree of excitement, for example, in accordance with an aggregation method designated by the performers who are in the event venue. For example, conditions such as a method for determining the degree of excitement based on motion and a method of arrangement of information on each degree of excitement when visualizing the excitement information are designated as the aggregation method.

The aggregation server 12 determines the degree of excitement of the users of the HMDs 21 to 24, that is, the degree of excitement of the spectators who are at distant location, on the basis of the motion information of the users of the HMDs 21 to 24.

The aggregation server 12 generates a heat map image that visualizes the degree of excitement of all the spectators who are at distant location, and then transmits data of the heat map image to the display control apparatus 2 installed in the event venue. The heat map image is an image formed by arranging information that visually indicates the degree of excitement of each user at a position according to the attribute of each user.

The display control apparatus 2 receives the data transmitted from the aggregation server 12 and then causes the large display 3 to display the heat map image.

Figure 7:
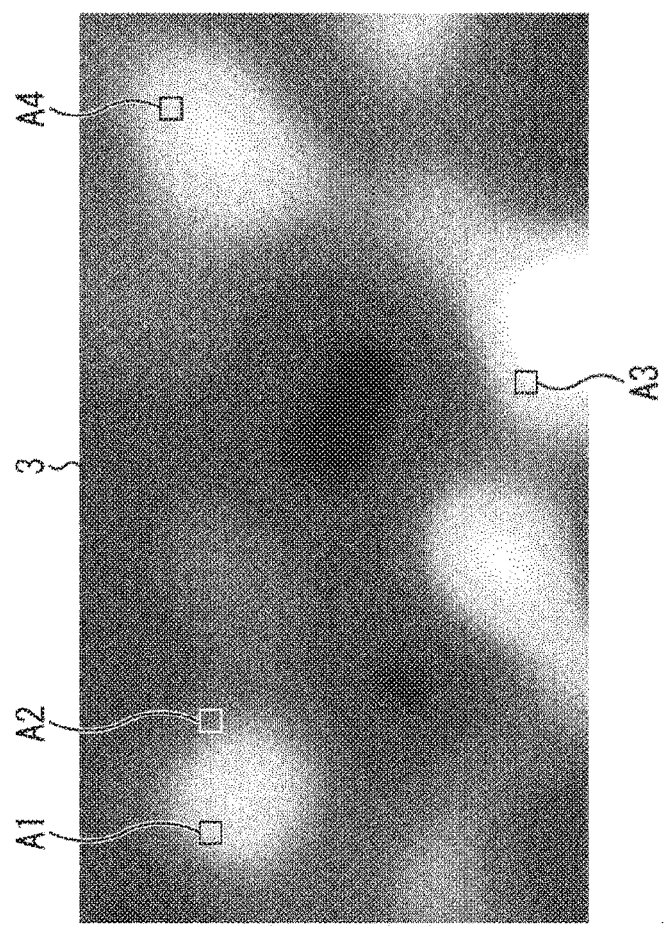
FIG. 7 is a diagram illustrating an example of a heat map image.

FIG. 7 is a diagram illustrating an example of the heat map image.

In the example of FIG. 7, the degree of excitement of each spectator who is at distant location is indicated by color. For example, when the performers designate determination of the degree of excitement on the basis of "intensity of the head motion", higher degree of excitement is set and color with higher saturation and brightness is assigned to the spectator with higher-intensity head motion.

The heat map image of FIG. 7 is an image formed by arranging images of predetermined color indicating excitement of respective spectators at positions corresponding to location information as the attributes of respective spectators.

For example, a region A1 of FIG. 7 is a region assigned to the user of the HMD 21 who is a spectator watching the live content in the Kanto district in Japan. The color of the region A1 indicates the degree of excitement of the user of the HMD 21. Also, a region A2 close to the region A1 is a region assigned to the user of the HMD 22 who is a spectator similarly watching the live content in the Kanto district. The color of the region A2 indicates the degree of excitement of the user of the HMD 22.

Also, a region A3 formed in a lower part is a region assigned to the user of the HMD 23 who is a spectator watching the live content in the Kyusyu district in Japan. The color of the region A3 indicates the degree of excitement of the user of the HMD 23. Also, a region A4 formed in an upper right part is a region assigned to the user of the HMD 24 who is a spectator watching the live content in the Hokkaido district in Japan. The color of the region A4 indicates the degree of excitement of the user of the HMD 24.

The region assigned to each user may be one pixel of the large display 3 and may be a region including a plurality of pixels. Also, a shape of the region can be not only a square but also any shape such as a circle.

Thus, since the information indicating the degree of excitement of the spectators who are at distant location is displayed, the performers who are in the event venue can realize the excitement of the spectators who are at distant location, and can improve motivation.

Also, since the information indicating the excitement of the spectators who are at distant location is arranged and displayed at the positions according to the attribute of each spectator, the performers can intuitively check spectators with which attribute are excited and spectators with which attribute are not. In the example of FIG. 7, the performers can intuitively check in which district of Japan the users are excited.

Also, since the performers can designate on the basis of what kind of motion to determine the degree of excitement, the performers can request the spectators who are at distant location to perform a predetermined motion, and can check how much the spectators react to the request. The performers can sequentially make an improvised request that, for example, the spectators of each area should perform a motion such as swaying the body, and can obtain a sense of togetherness with the spectators who are at distant location through such a two-way interaction.

Also, the spectators who are in the event venue can share the excitement with the spectators who are at distant location.

Meanwhile, the spectators who are at distant location can check the excitement of the spectators who are at distant location including themselves by changing the line of sight or the like and watching display on the large display 3 inside the live content. In addition, the spectators who are at distant location can obtain experience with realistic feeling by confirming that their excitement is conveyed to the performers and the spectators who are in the event venue.

It is to be noted that the data of the heat map image is also transmitted from the aggregation server 12 to the HMDs 21 to 24 as appropriate. In the HMDs 21 to 24, the heat map image is displayed superimposed on the video of the live content.

A series of processing steps of displaying the heat map image as described above will be described later.

<Configuration of Each Device>

Configuration of HMD

Figure 8:
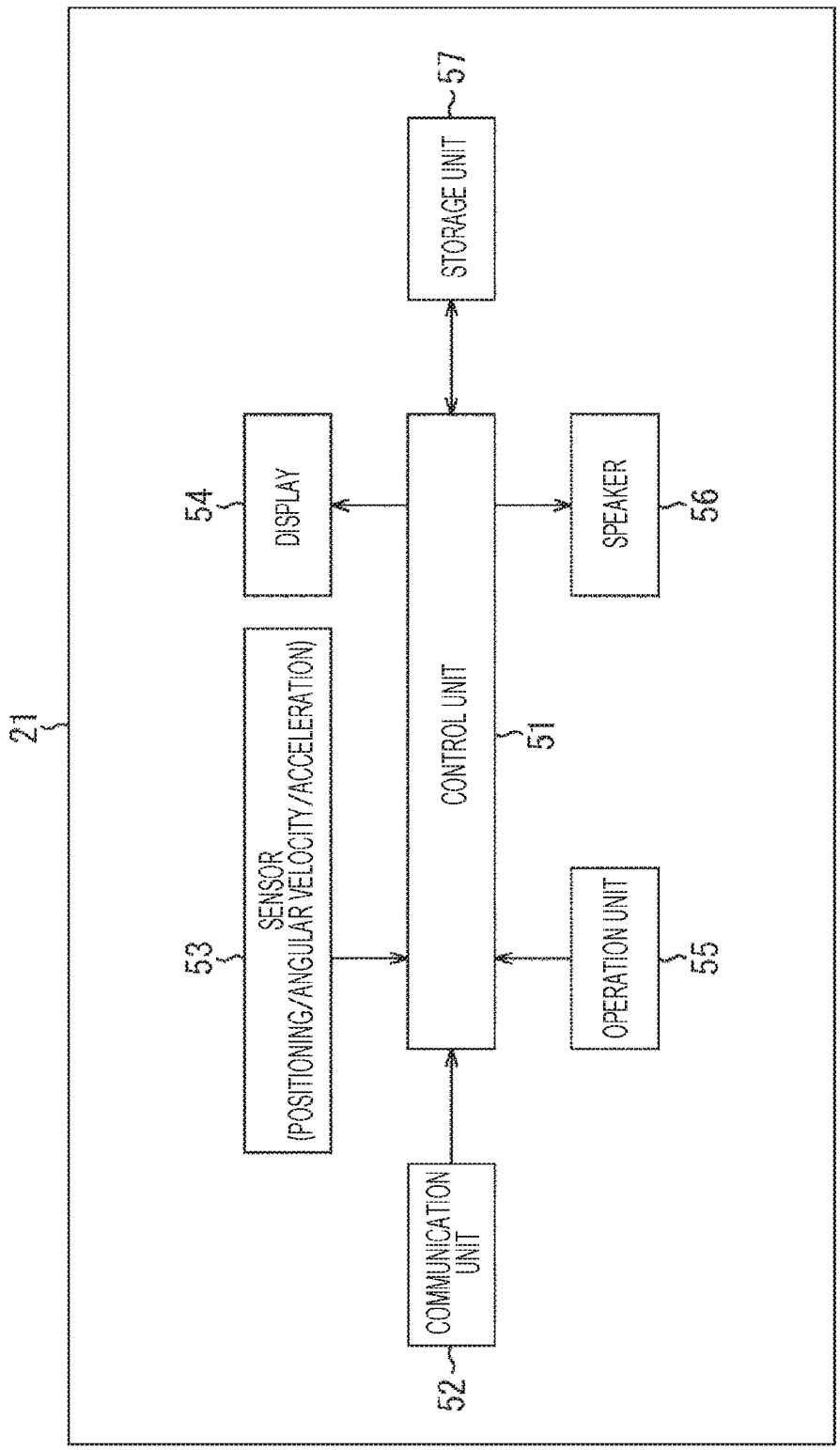
FIG. 8 is a block diagram illustrating a configuration example of an HMD.

FIG. 8 is a block diagram illustrating a configuration example of the HMD 21.

The HMD 21 includes a communication unit 52, a sensor 53, a display 54, an operation unit 55, a speaker 56, and a storage unit 57, which are connected to a control unit 51.

The control unit 51 includes elements such as a central processing unit (CPU), a read only memory (ROM), and a random access memory (RAM). The control unit 51 executes a predetermined program and controls an overall operation of the HMD 21.

The communication unit 52 communicates with the distribution server 11 and the aggregation server 12, for example, wirelessly. The communication unit 52 receives the live content transmitted from the distribution server 11 and then outputs the live content to the control unit 51. In addition, the communication unit 52 transmits the motion information and the user attribute information supplied from the control unit 51 to the aggregation server 12.

The sensor 53 includes a global positioning system (GPS) sensor, an angular velocity sensor, an acceleration sensor, and other sensors. The sensor 53 performs positioning and detection of an angular velocity and acceleration during reproduction of the live content, and then outputs sensor data to the control unit 51.

The display 54 includes an LCD, an organic EL display, or the like, and displays the video of the live content in accordance with control performed by the control unit 51.

The operation unit 55 includes operation buttons and the like provided on an enclosure surface of the HMD 21. Selection of the live content, selection of the visual point, and the like are performed using the operation unit 55.

The speaker 56 outputs audio on the basis of audio data contained in the live content supplied from the control unit 51 during reproduction of the live content.

The storage unit 57 includes a flash memory or a memory card inserted into a card slot provided in the enclosure.

The HMDs 22 to 24 each have the configuration identical to the configuration of the HMD 21. The following description cites the configuration of FIG. 8 as the configuration of the HMDs 22 to 24 as appropriate.

Figure 9:
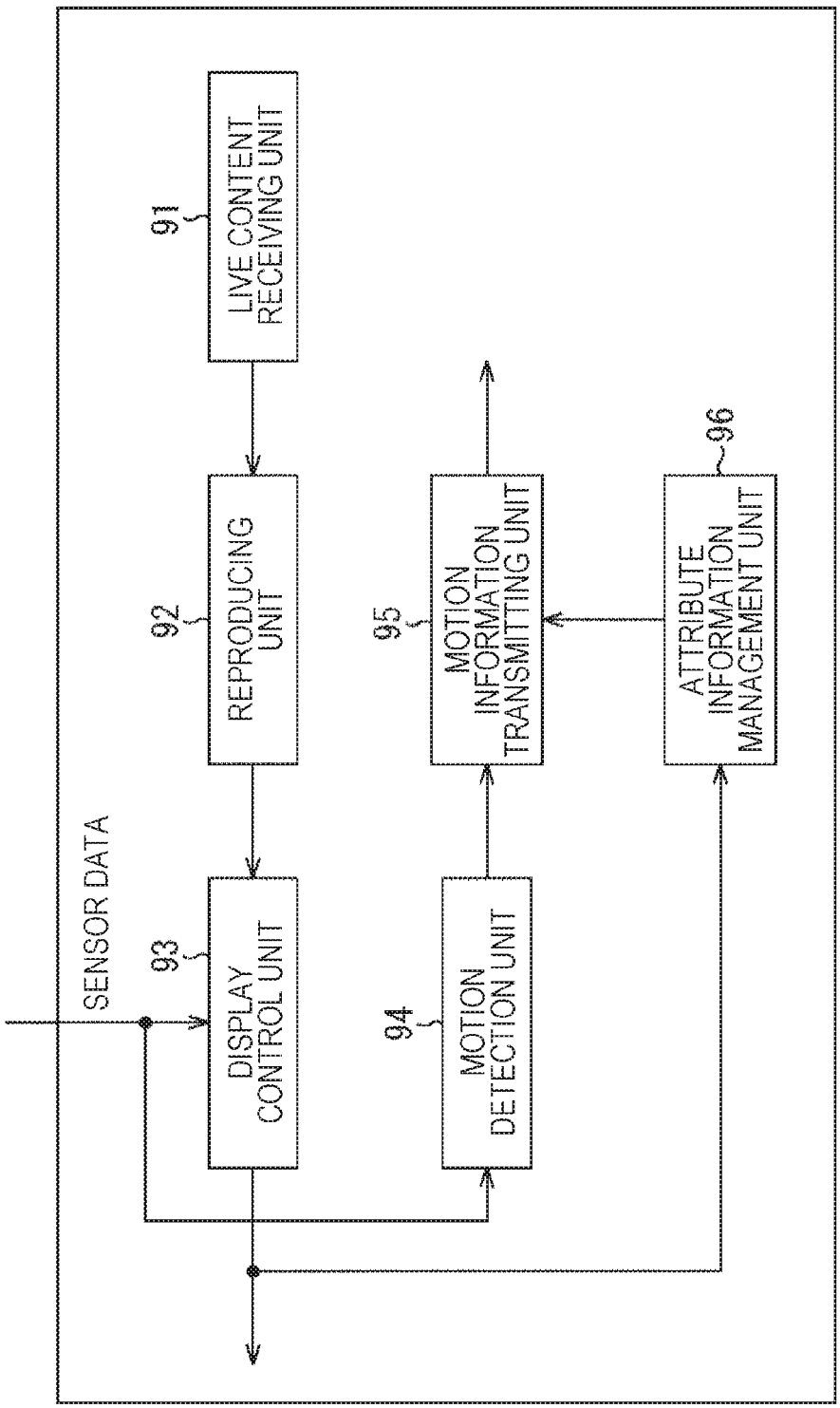
FIG. 9 is a block diagram illustrating a functional configuration example of a control unit.

FIG. 9 is a block diagram illustrating a configuration example of the control unit 51.

At least part of functional units illustrated in FIG. 9 is implemented by a CPU of the control unit 51 executing a predetermined program. As illustrated in FIG. 9, in the control unit 51, a live content receiving unit 91, a reproducing unit 92, a display control unit 93, a motion detection unit 94, a motion information transmitting unit 95, and an attribute information management unit 96 are implemented. The sensor data that is output from the sensor 53 is input into the display control unit 93 and the motion detection unit 94.

The live content receiving unit 91 controls the communication unit 52 and receives the live content transmitted from the distribution server 11. The live content receiving unit 91 outputs the received live content to the reproducing unit 92.

The reproducing unit 92 reproduces the live content supplied from the live content receiving unit 91. The reproducing unit 92 decodes, for example, the video stream of the video of the visual point selected by the user contained in the live content, and then outputs data obtained by decoding the video stream to the display control unit 93.

The display control unit 93 causes the display 54 to display the video of the predetermined visual field of the live content on the basis of the data supplied from the reproducing unit 92. In addition, during reproduction of the live content, the display control unit 93 identifies the visual field of the user on the basis of the sensor data, such as an angular velocity and acceleration, and then switches the display range of the video. Information indicating the visual field of the user is supplied to the attribute information management unit 96.

The motion detection unit 94 detects a plurality of types of user motion during reproduction of the live content on the basis of the sensor data such as an angular velocity and acceleration. The motion detection unit 94 outputs the motion information indicating the detected motion to the motion information transmitting unit 95. Vital signs including a pulse, a heart rate, a body temperature, and other signs are added to the motion information.

The motion information transmitting unit 95 controls the communication unit 52 and transmits the motion information supplied from the motion detection unit 94 and the user attribute information read from the attribute information management unit 96 to the aggregation server 12. Transmission of the motion information and the user attribute information is repeatedly performed, for example, during reproduction of the live content.

The attribute information management unit 96 manages the user attribute information and outputs the user attribute information to the motion information transmitting unit 95 as appropriate.

FIG. 10 is a diagram illustrating an example of information included in the user attribute information.

The user attribute information includes location information, favorite information, and visual field information.

The location information is information indicating rough location, such as a district unit. The location information may be acquired on the basis of positioning results performed by the GPS sensor that constitutes the sensor 53, and may be input by the user.

The favorite information is information indicating a favorite person reflected in the live content the user is watching. The favorite information may be selected from a list of performers at a time of starting watching of the live content, or the favorite information may be specified by the attribute information management unit 96 on the basis of the visual field of the user. In this case, for example, the attribute information management unit 96 identifies a time period and a position of each performer reflected in the visual field of the user. The attribute information management unit 96 then specifies the performer who is reflected for a longer time in the visual field of the user and reflected at a position close to a center of the visual field as the favorite person of the user.

The visual field information is information indicating the visual field of the user identified on the basis of the sensor data such as an angular velocity and acceleration. As described above, the visual field of the user is identified by using a position of the visual point, a direction of the line of sight, and the angle of view of the display 54. Where in the event venue the user sees is identified by using the visual field information.

The user attribute information can include at least one of various types of information, such as the user's national origin, hobby, area of expertise, gender, and user ID. The user attribute information includes at least one of a plurality of types of information.

Configuration of Server

Figure 11:
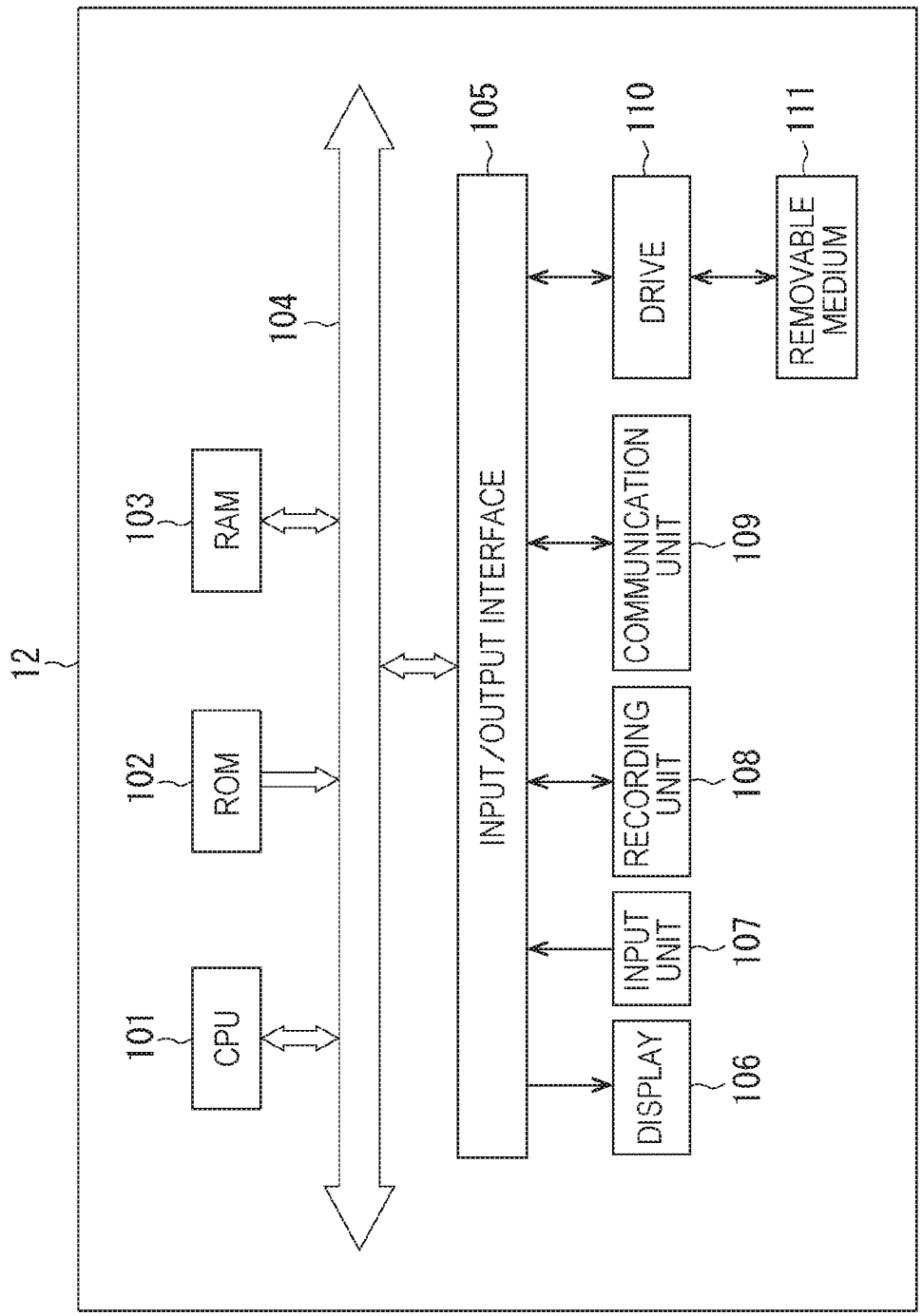
FIG. 11 is a block diagram illustrating a configuration example of an aggregation server.

FIG. 11 is a block diagram illustrating a configuration example of the aggregation server 12.

A CPU 101, a ROM 102, and a RAM 103 are connected to one another via a bus 104. An input/output interface 105 is also connected to the bus 104. A display 106 and an input unit 107 are connected to the input/output interface 105. The input unit 107 is a keyboard, a mouse, or the like, and is used by an administrator of the aggregation server 12.

In addition, a recording unit 108 including a hard disk, a nonvolatile memory, or the like, and a communication unit 109, which is a network interface and communicates with other devices via the network, are connected to the input/output interface 105. A drive 110 that drives a removable medium 111 is also connected to the input/output interface 105.

Figure 12:
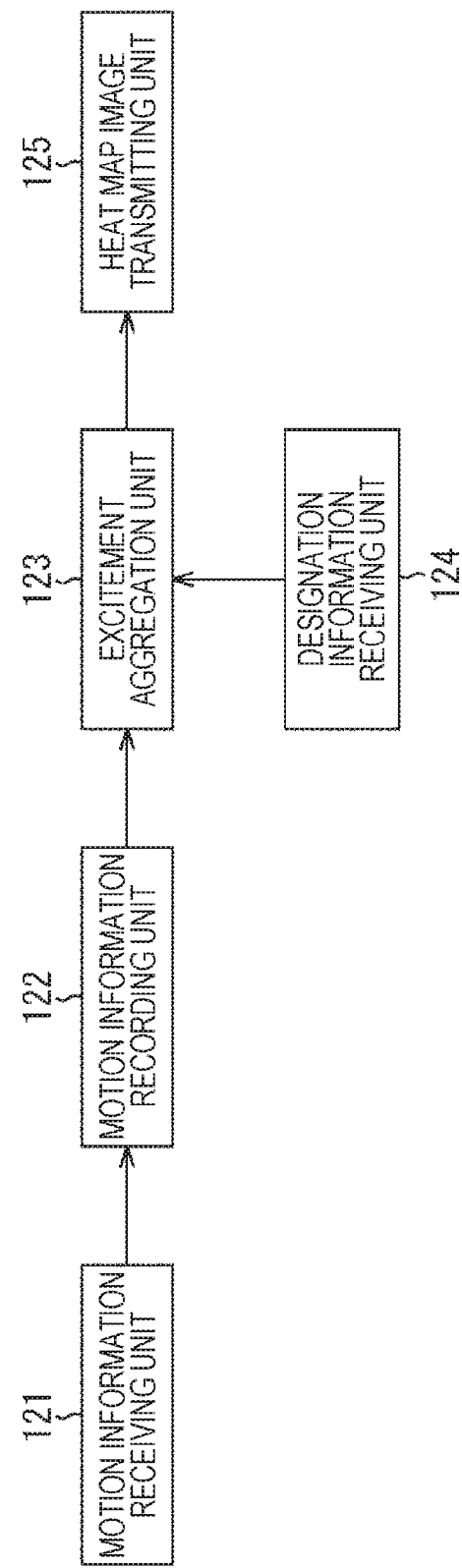
FIG. 12 is a block diagram illustrating a functional configuration example of the aggregation server.

FIG. 12 is a block diagram illustrating a functional configuration example of the aggregation server 12.

At least part of functional units illustrated in FIG. 12 is implemented by the CPU 101 executing a predetermined program. As illustrated in FIG. 12, in the aggregation server 12, a motion information receiving unit 121, a motion information recording unit 122, an excitement aggregation unit 123, a designation information receiving unit 124, and a heat map image transmitting unit 125 are implemented.

The motion information receiving unit 121 controls the communication unit 109 and receives the motion information and the user attribute information transmitted from the HMDs 21 to 24. The motion information receiving unit 121 causes the motion information recording unit 122 to record the received motion information and the user attribute information.

The motion information recording unit 122 records the motion information and the user attribute information. The motion information and the user attribute information recorded in the motion information recording unit 122 are read by the excitement aggregation unit 123 as appropriate.

The excitement aggregation unit 123 reads the motion information and the user attribute information from the motion information recording unit 122. The excitement aggregation unit 123 then aggregates the degree of excitement of the spectators who are at distant location in accordance with the aggregation method designated by the performers who are in the event venue. The vital signs added to the motion information are also used for determining the degree of excitement as appropriate.

As described above, the method for determining the degree of excitement based on the motion, the method of arrangement of the information on each degree of excitement when visualizing the excitement information, and the like are designated by the performers. The aggregation method designated by the performers is indicated by aggregation method designation information supplied from the designation information receiving unit 124.

For example, when the method for determining the degree of excitement is designated on the basis of whether the head is shaken intensely, the excitement aggregation unit 123 determines the degree of excitement of each user on the basis of the degree to which the user is shaking the head up and down which is indicated using the motion information.

In addition, when the method for determining the degree of excitement is designated on the basis of whether the user is in rhythm, the excitement aggregation unit 123 determines the degree of excitement of each user on the basis of the degree to which the user is swaying the body which is indicated using the motion information.

Specifically, the excitement aggregation unit 123 applies Fourier transform or wavelet transform to information indicating the motion of the user head or the motion of the user body to perform frequency conversion. The excitement aggregation unit 123 determines the degree of excitement of each user by applying calculation using a predetermined function, such as an identity function, step function, and sigmoid function, to a value obtained by performing frequency conversion and a value such as a heart rate, body temperature, and the like indicated by the vital signs.

The excitement aggregation unit 123 generates the heat map image by arranging the information that visually indicates the degree of excitement of each user determined in this way by the method designated by the performers who are in the event venue with reference to the user attribute information.

For example, the excitement aggregation unit 123 divides the information that visually indicates the degree of excitement of each user into groups each of which includes the degrees of excitement of the users of an identical area. The excitement aggregation unit 123 then arranges each group together on the heat map image. The location information included in the user attribute information indicates in which area each user is.

Thus, the excitement aggregation unit 123 visualizes the excitement information on the spectators who are at distant location, and then outputs the data of the heat map image to the heat map image transmitting unit 125.

The designation information receiving unit 124 controls the communication unit 109 and receives the aggregation method designation information transmitted from the display control apparatus 2. The designation information receiving unit 124 outputs the received aggregation method designation information to the excitement aggregation unit 123.

The heat map image transmitting unit 125 controls the communication unit 109 and transmits the data of the heat map image supplied from the excitement aggregation unit 123 to the display control apparatus 2. The heat map image transmitting unit 125 also transmits the data of the heat map image to the HMDs 21 to 24 as appropriate.

It is to be noted that the distribution server 11 also has the configuration identical to the configuration of the aggregation server 12 illustrated in FIG. 11. The following description cites the configuration of FIG. 11 as the configuration of the distribution server 11 as appropriate.

Figure 13:
FIG. 13 is a block diagram illustrating a functional configuration example of a distribution server.

FIG. 13 is a block diagram illustrating a functional configuration example of the distribution server 11.

At least part of functional units illustrated in FIG. 13 is implemented by the CPU 101 of the distribution server 11 (FIG. 11) executing a predetermined program. As illustrated in FIG. 13, in the distribution server 11, a moving picture acquisition unit 131, alive content generation unit 132, and a distribution unit 133 are implemented.

The moving picture acquisition unit 131 controls the communication unit 109 and receives the moving picture of each visual point transmitted from the capturing control apparatus 1. The moving picture acquisition unit 131 outputs data of the received moving picture to the live content generation unit 132.

The live content generation unit 132 generates the live content for distribution on the basis of the data of the moving picture supplied from the moving picture acquisition unit 131, and then outputs the live content for distribution to the distribution unit 133.

The distribution unit 133 controls the communication unit 109 and distributes the live content generated by the live content generation unit 132 to the HMDs 21 to 24.

Configuration of Display Control Apparatus

Figure 14:
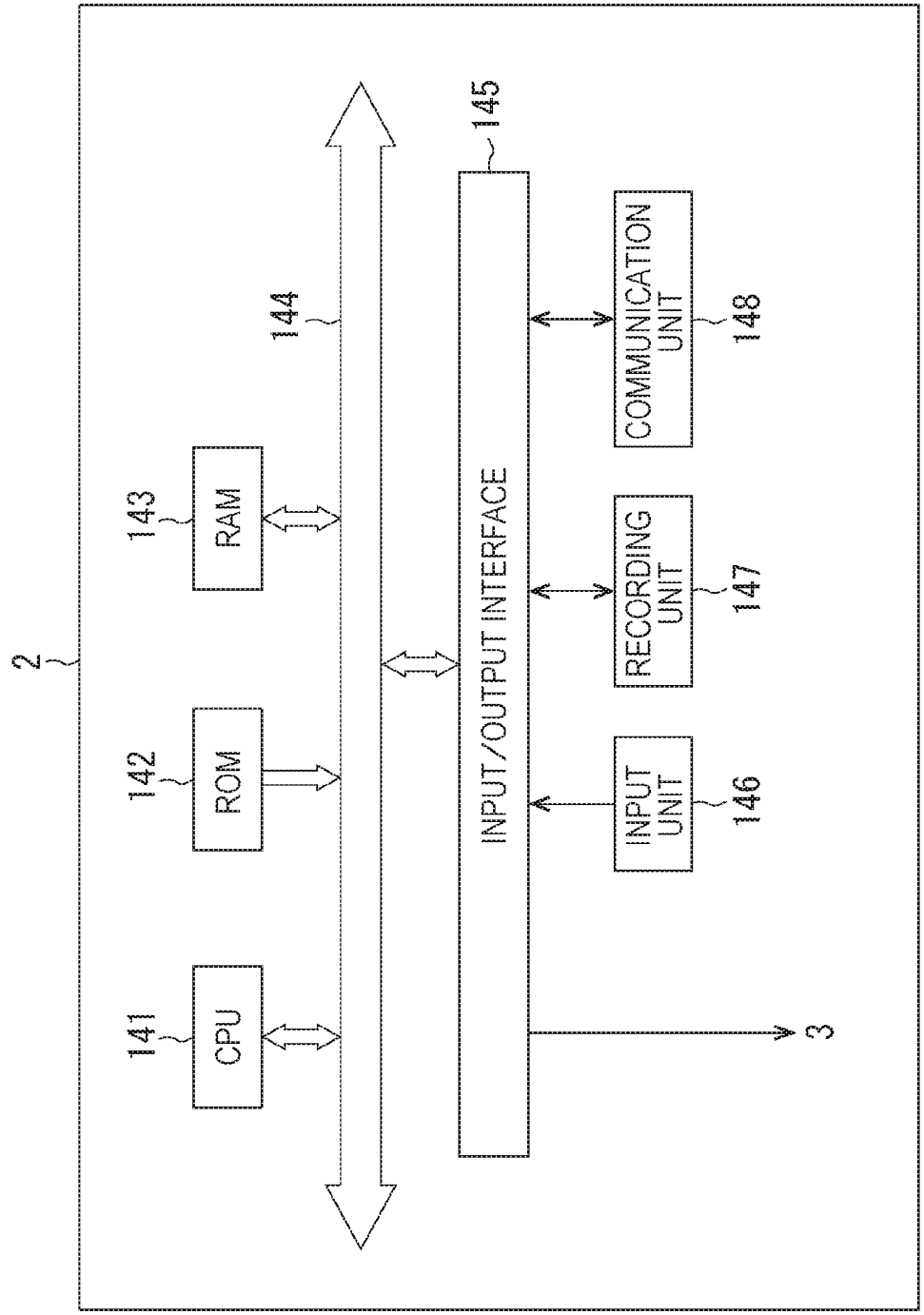
FIG. 14 is a block diagram illustrating a configuration example of a display control apparatus.

FIG. 14 is a block diagram illustrating a configuration example of the display control apparatus 2.

A CPU 141, a ROM 142, and a RAM 143 are connected to one another via a bus 144. An input/output interface 145 is also connected to the bus 144. The large display 3 is connected to the input/output interface 145. In addition, an input unit 146 operated by an administrator of the display control apparatus 2, such as a keyboard and a mouse, is connected to the input/output interface 145.

A recording unit 147 including a hard disk, a nonvolatile memory, and the like, and a communication unit 148 that communicates with other devices via a network are also connected to the input/output interface 145.

Figure 15:
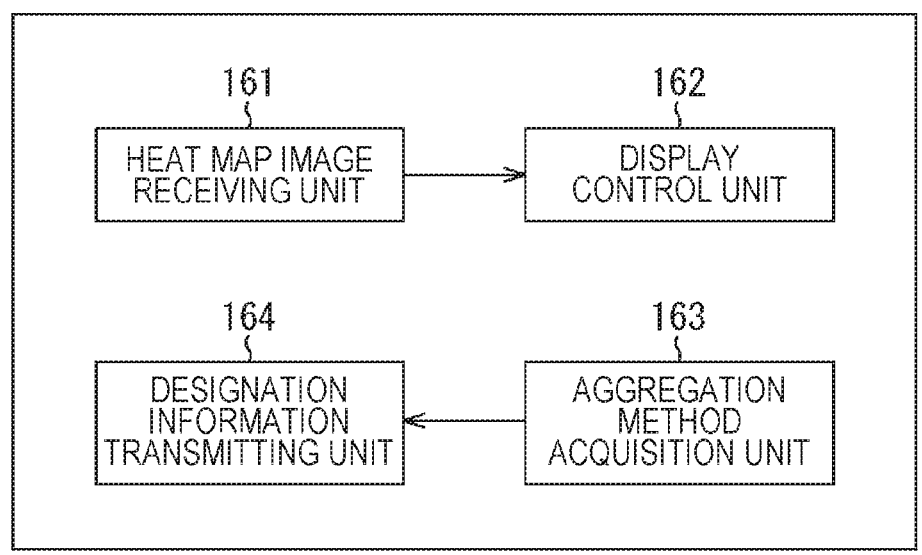
FIG. 15 is a block diagram illustrating a functional configuration example of the display control apparatus.

FIG. 15 is a block diagram illustrating a functional configuration example of the display control apparatus 2.

At least part of functional units illustrated in FIG. 15 is implemented by the CPU 141 executing a predetermined program. As illustrated in FIG. 15, in the display control apparatus 2, a heat map image receiving unit 161, a display control unit 162, an aggregation method acquisition unit 163, and a designation information transmitting unit 164 are implemented.

The heat map image receiving unit 161 controls the communication unit 148 and receives the data of the heat map image transmitted from the aggregation server 12. The heat map image receiving unit 161 outputs the data of the heat map image to the display control unit 162.

The display control unit 162 causes the large display 3 to display the heat map image on the basis of the data supplied from the heat map image receiving unit 161.

The aggregation method acquisition unit 163 controls the communication unit 148 and communicates with, for example, the portable terminals the performers have. The aggregation method acquisition unit 163 receives the aggregation method designation information transmitted from the portable terminals, the aggregation method designation information designating the aggregation method of the degree of excitement of the users who are at distant location. The aggregation method acquisition unit 163 outputs the received aggregation method designation information to the designation information transmitting unit 164. The designation of the aggregation method may not be performed by the performers but may be performed by an operator of the concert.

The designation information transmitting unit 164 controls the communication unit 148 and transmits the aggregation method designation information supplied from the aggregation method acquisition unit 163 to the aggregation server 12.

<Operation of Each Device>

Here, an operation of each device having the aforementioned configuration will be described.

First, with reference to a flowchart of FIG. 16, processing of the distribution server 11 that distributes the live content will be described.

Figure 16:
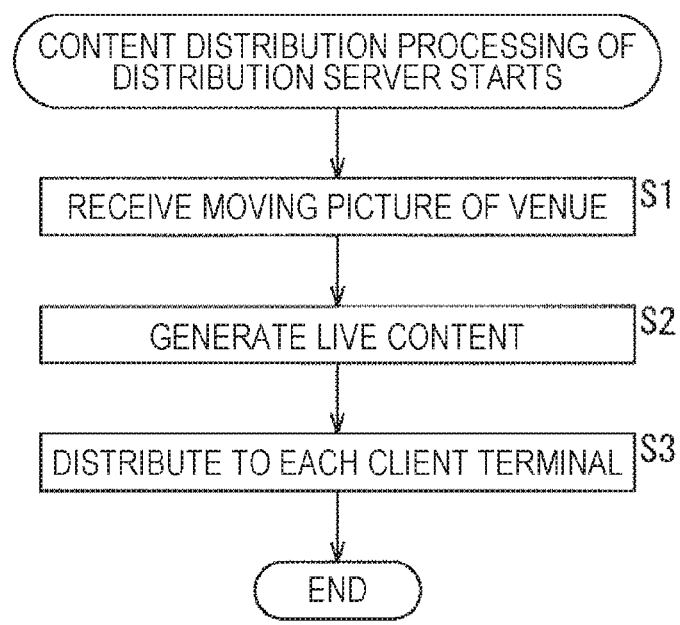
FIG. 16 is a flowchart illustrating content distribution processing of the distribution server.

The processing of FIG. 16 starts when the concert starts in the event venue and the moving picture of the event venue is transmitted from the capturing control apparatus 1.

In step S1, the moving picture acquisition unit 131 receives the moving picture of each visual point transmitted from the capturing control apparatus 1.

In step S2, the live content generation unit 132 generates the live content for distribution on the basis of the moving picture received by the moving picture acquisition unit 131.

In step S3, the distribution unit 133 distributes the live content generated by the live content generation unit 132 to the HMDs 21 to 24. When the distribution of the live content ends, the distribution unit 133 ends the processing.

Figure 17:
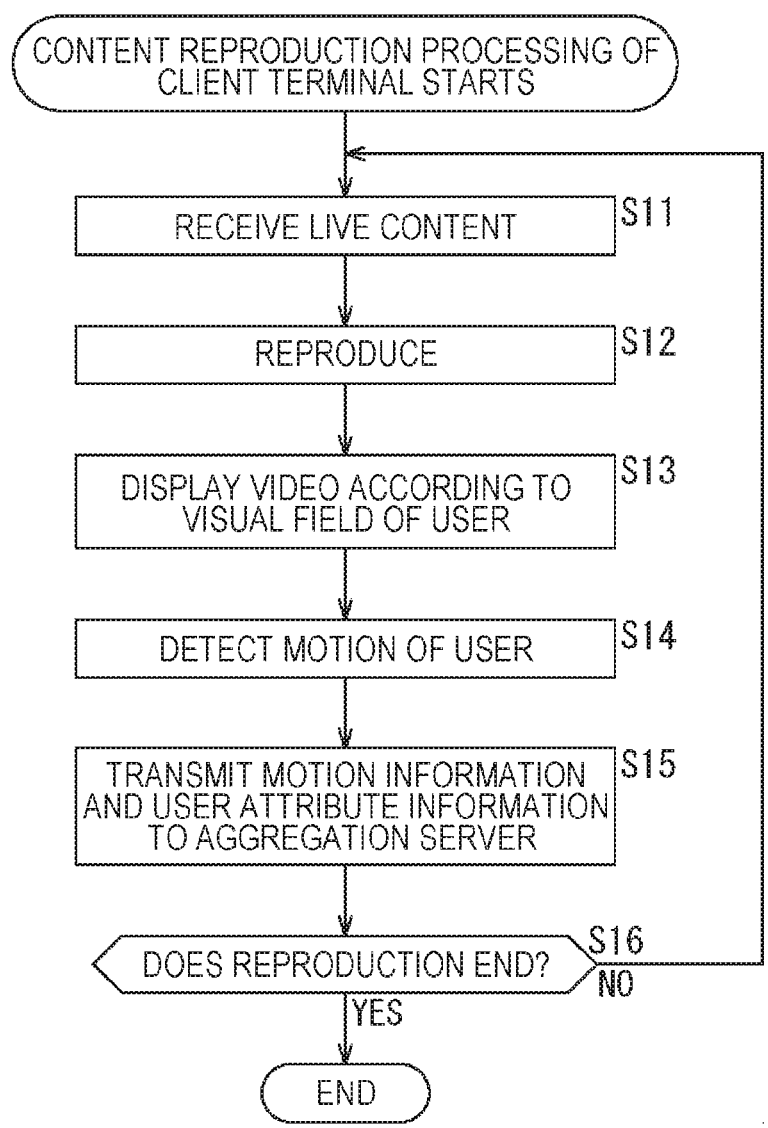
FIG. 17 is a flowchart illustrating reproduction processing of a client terminal.

Next, with reference to a flowchart of FIG. 17, processing of the client terminal that reproduces the live content will be described. While the description is made here on an assumption that the HMD 21 performs the processing, similar processing is also performed in the HMDs 22 to 24.

In step S11, the live content receiving unit 91 receives the live content transmitted from the distribution server 11.

In step S12, the reproducing unit 92 reproduces the live content received by the live content receiving unit 91.

In step S13, the display control unit 93 causes the display 54 to display the video according to the visual field of the user on the basis of the data obtained by decoding the video stream of the video of a predetermined visual point. In addition, the display control unit 93 identifies the visual field of the user on the basis of the sensor data, and then switches the display range of the video. The visual field information indicating the visual field of the user is included in the user attribute information and is managed by the attribute information management unit 96.

In step S14, the motion detection unit 94 detects a plurality of types motion of the user on the basis of the sensor data.

In step S15, the motion information transmitting unit 95 adds the vital signs to the motion information indicating the motion of the user detected by the motion detection unit 94. The motion information transmitting unit 95 then transmits the motion information and the vital signs to the aggregation server 12 together with the user attribute information read from the attribute information management unit 96.

In step S16, the reproducing unit 92 determines whether the reproduction ends. When the reproducing unit 92 determines in step S16 that the reproduction does not end, the processing returns to step S11, and the subsequent processing will be performed.

On the other hand, when the reproducing unit 92 determines in step S16 that the reproduction ends for a reason that the live content has been reproduced to the end or other reasons, the reproducing unit 92 ends the processing.

Next, with reference to a flowchart of FIG. 18, processing of the aggregation server 12 that aggregates the excitement of the spectators who are at distant location will be described.

In step S21, the motion information receiving unit 121 receives the motion information and the user attribute information transmitted from the HMDs 21 to 24.

In step S22, the motion information recording unit 122 associates the motion information with the user attribute information, and records the motion information and the user attribute information In step S23, the designation information receiving unit 124 receives the aggregation method designation information transmitted from the display control apparatus 2.

In step S24, the excitement aggregation unit 123 aggregates the degree of excitement of the spectators who are at distant location in accordance with the aggregation method designated by the performers. The excitement aggregation unit 123 then generates the heat map image.

In step S25, the heat map image transmitting unit 125 transmits the data of the heat map image to the display control apparatus 2.

In step S26, the heat map image transmitting unit 125 transmits the data of the heat map image to the HMDs 21 to 24, and then ends the processing.

Figure 18:
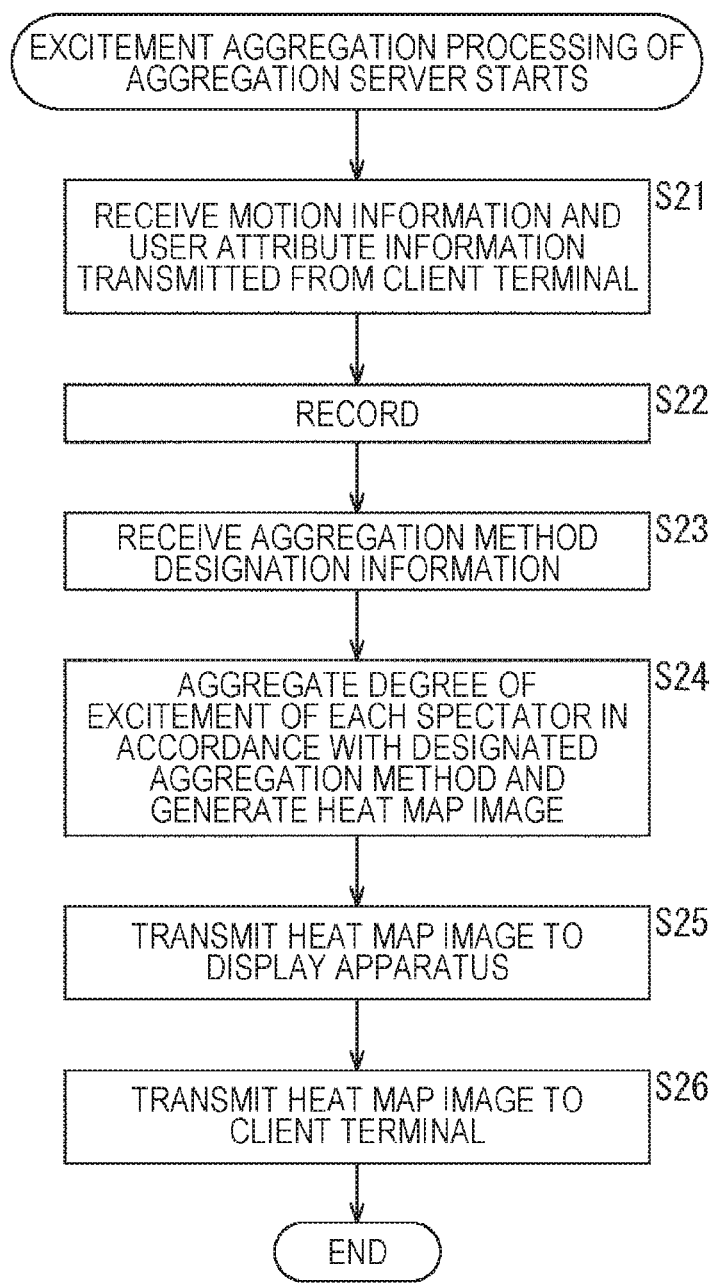
FIG. 18 is a flowchart illustrating excitement aggregation processing of the aggregation server.

For example, every time the aggregation method is designated by the performers, the processing of FIG. 18 is performed, and the heat map image is transmitted to the display control apparatus 2. Every time the performers designate the aggregation method, the performers can switch display of the heat map image.

Figure 19:
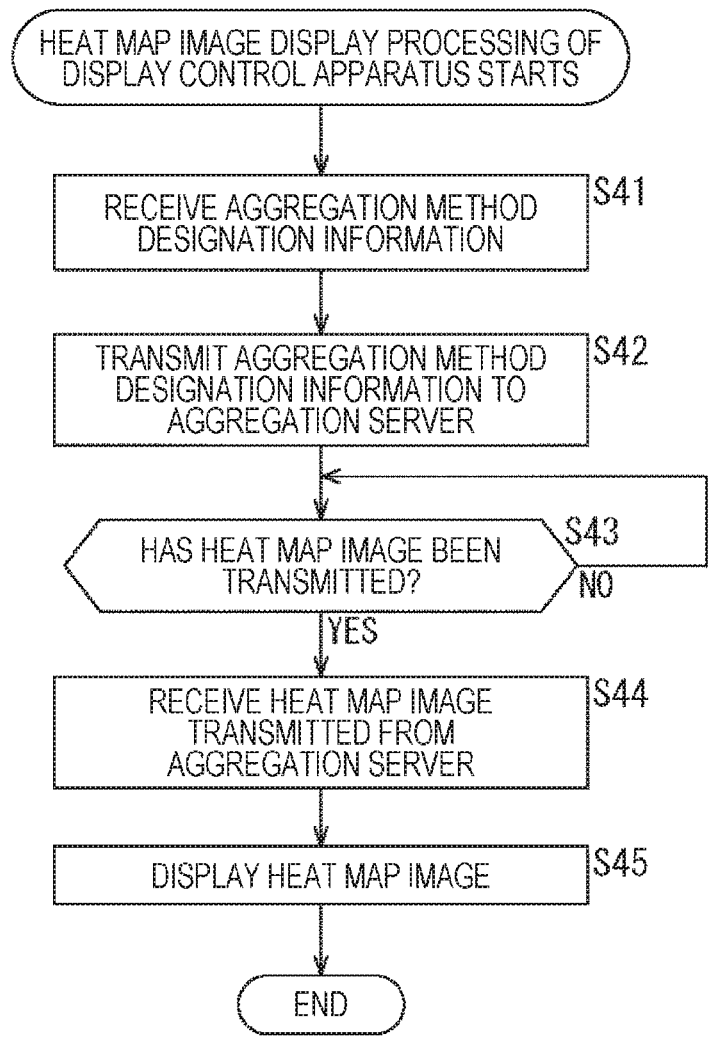
FIG. 19 is a flowchart illustrating heat map image display processing of the display control apparatus.

Next, with reference to a flowchart of FIG. 19, processing of the display control apparatus 2 that displays the heat map image will be described.

In step S41, the aggregation method acquisition unit 163 receives the aggregation method designation information transmitted from the portable terminals the performers have.

In step S42, the designation information transmitting unit 164 transmits the aggregation method designation information received by the aggregation method acquisition unit 163 to the aggregation server 12. In the aggregation server 12, the processing of FIG. 18 is performed and the data of the heat map image is transmitted to the display control apparatus 2.

In step S43, the heat map image receiving unit 161 determines whether the data of the heat map image has been transmitted from the aggregation server 12. The heat map image receiving unit 161 stands by until determination is made that the data has been transmitted.

When the determination is made in step S43 that the data of the heat map image has been transmitted from the aggregation server 12, in step S44, the heat map image receiving unit 161 receives the data of the heat map image.

In step S45, the display control unit 162 causes the large display 3 to display the heat map image on the basis of the data received by the heat map image receiving unit 161.

By seeing the heat map image displayed on the large display 3, the performers and the spectators who are in the event venue, and the spectators who are at distant location can share an atmosphere of the concert.

Next, with reference to a flowchart of FIG. 20, processing of the HMD 21 as the client terminal that displays the heat map image will be described.

Figure 20:
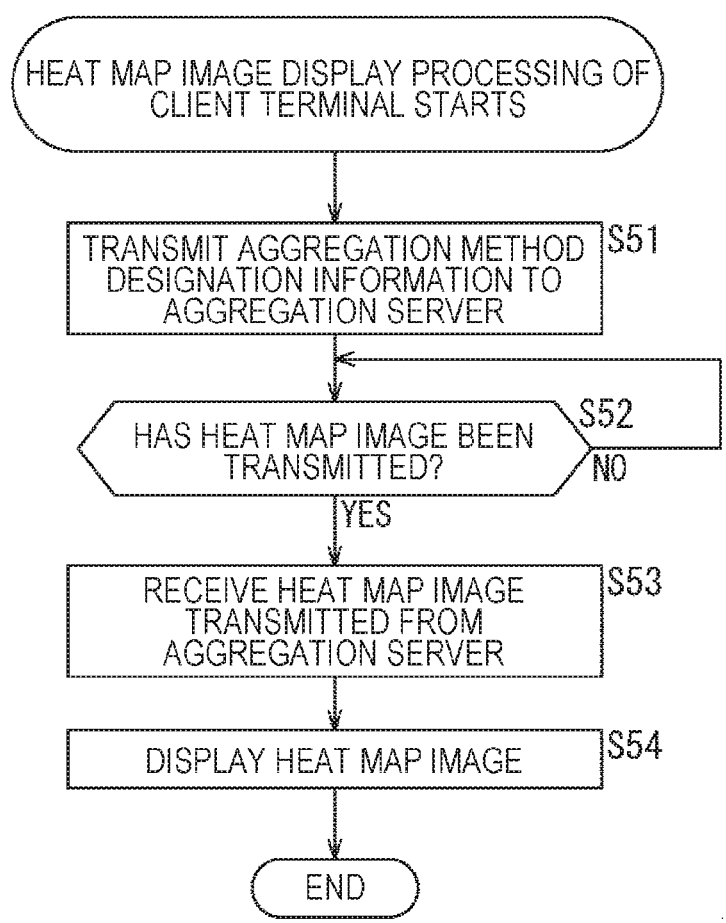
FIG. 20 is a flowchart illustrating the heat map image display processing of the client terminal.

The processing of FIG. 20 starts, for example, when display of the heat map image is instructed while the live content is watched. When display of the heat map image is instructed, the aggregation method of the degree of excitement is designated by the user.

Thus, the users of the HMDs 21 to 24 can also designate the aggregation method of the degree of excitement. The processing described with reference to FIG. 18 is performed by the aggregation server 12 in accordance with the aggregation method designated by the users of the HMDs 21 to 24, and then the heat map image is transmitted, for example, to the HMD 21.

In step S51, the communication unit 52 transmits the aggregation method designation information that designates the aggregation method designated by the user to the aggregation server 12.

In step S52, the communication unit 52 determines whether the data of the heat map image has been transmitted from the aggregation server 12. The communication unit 52 stands by until the determination is made that the data has been transmitted.

When the determination is made in step S52 that the data of the heat map image has been transmitted from the aggregation server 12, in step S53, the communication unit 52 receives the data of the heat map image. The data of the heat map image is supplied to the display control unit 93 via a path which is not illustrated.

In step S54, the display control unit 93 causes the display 54 to display the heat map image superimposed on the video of the live content.

Figure 21:
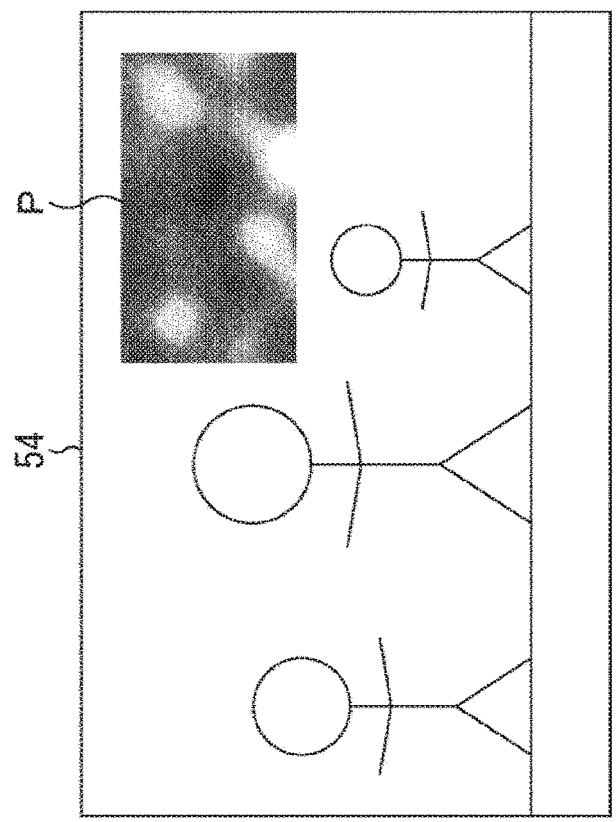
FIG. 21 is a diagram illustrating a display example of a display.

FIG. 21 is a diagram illustrating a display example of the display 54.

In the example of FIG. 21, a heat map image P superimposed on the video of the live content is displayed in an upper right of the display 54. The user of the HMD 21 can check the degree of excitement of the spectators who are at distant location by seeing the heat map image generated in accordance with the aggregation method specified by the user.

By a series of the aforementioned processing steps, the aggregation server 12 can acquire the excitement information on the spectators who are at distant location in a more natural way without causing the users who are watching the live content to perform active operations. In addition, by transmitting the heat map image that visualizes the excitement information to the event venue and causing the large display 3 to display the heat map image, the aggregation server 12 can present the degree of excitement of the spectators who are at distant location to the performers and the spectators in an easier-to-see way.

<Example of Heat Map Image>

As described above, the performers can switch display of the heat map image by designating the aggregation method.

Figure 22:
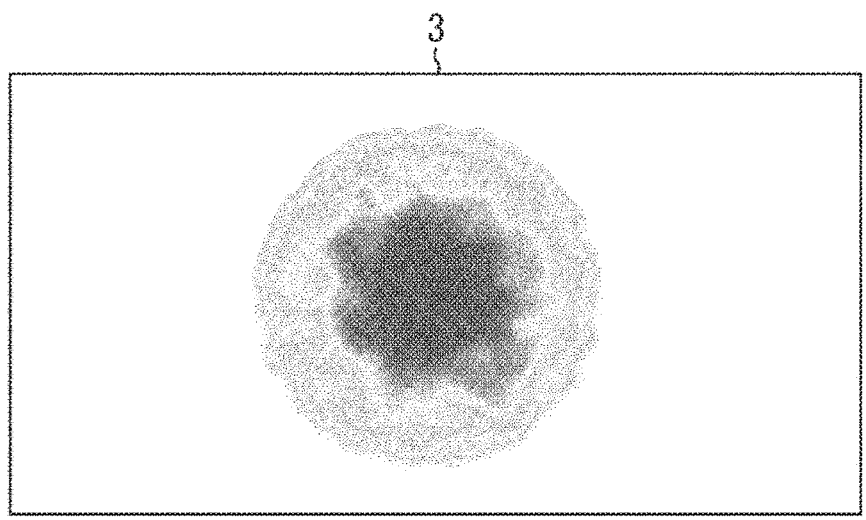
FIG. 22 is a diagram illustrating another example of the heat map image.

FIG. 22 is a diagram illustrating another example of the heat map image.

The heat map image of FIG. 22 is an image made by arranging a shade of color indicating the degree of excitement outward from a center in decreasing order of the degree of excitement. The degree of excitement is determined, for example, on the basis of "intensity of motion of the head."

The performers can change the heat map image of FIG. 7 to display of FIG. 22, for example, by designating the aggregation method.

The shade of color may be arranged at a position according to a user ID as the attribute of each user.

Figure 23:
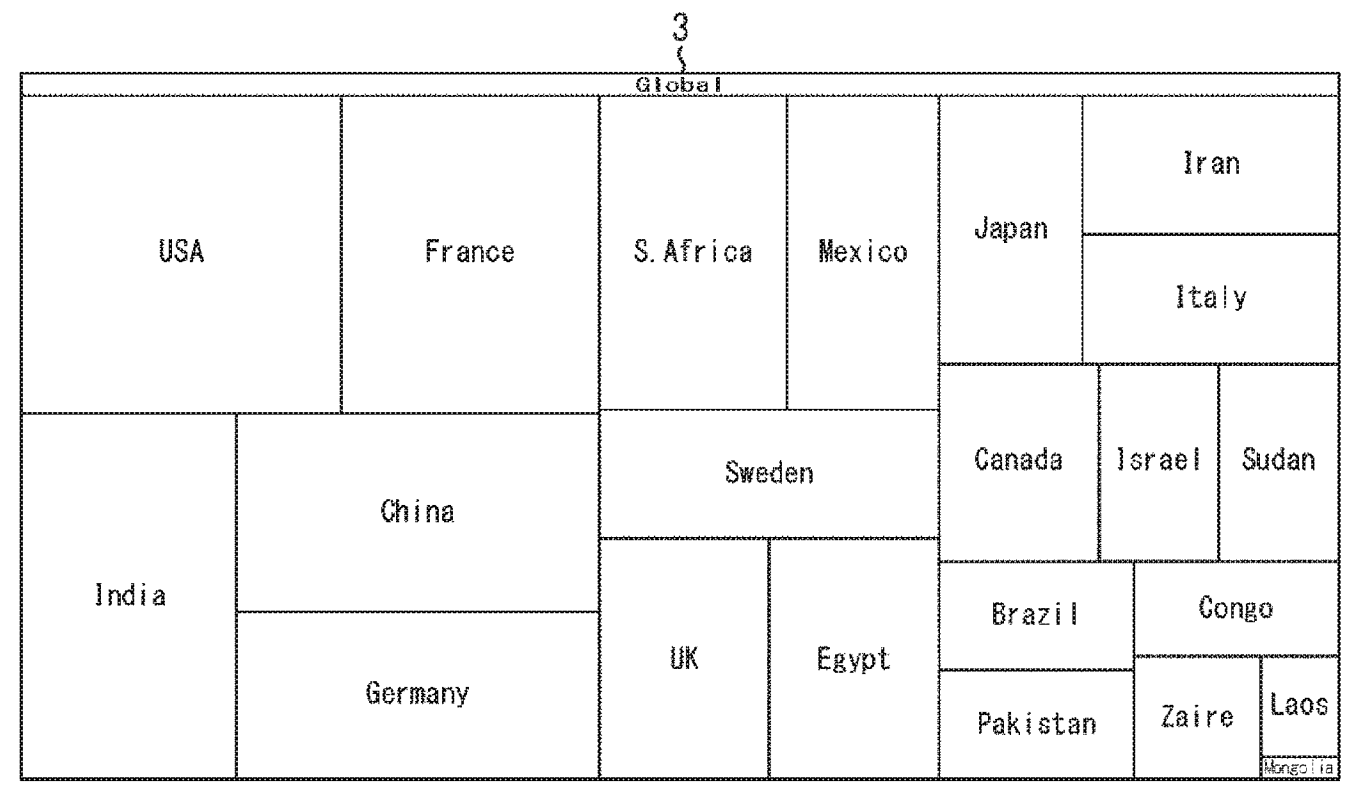

Also, the heat map image may be displayed with the information indicating the degree of excitement of each national origin of the user arranged together as illustrated in FIG. 23, instead of each area inside Japan.

In the example of FIG. 23, the information indicating the degree of excitement of the users from the United States indicated by their attribute is arranged in an upper left region of the large display 3. In addition, the information indicating the degree of excitement of the users from India is arranged in a lower left region of the large display 3.

Thus, the performers can designate various methods as the method for arranging the information indicating the degree of excitement of each user.

For example, it is also possible to arrange together the information indicating the degree of excitement of the users who have a common favorite performer.

When the performers are persons H1, H2, and H3, the information indicating the degree of excitement of the user who likes the person H1, the information indicating the degree of excitement of the user who likes the person H2, and the information indicating the degree of excitement of the user who likes the person H3 are each collected and displayed in a predetermined region. Which performer each user likes is indicated by the favorite information included in the user attribute information.

This allows each performer to check the degree of excitement of fans of the performer.

In addition, it is also possible to arrange together the information indicating the degree of excitement of the users who see a common range.

When the performers are persons H1, H2, and H3, the information indicating the degree of excitement of the user who sees the person H1, the information indicating the degree of excitement of the user who sees the person H2, and the information indicating the degree of excitement of the user who sees the person H3 are each collected and displayed in a predetermined region. Where each user sees is indicated by the visual field information included in the user attribute information.

Figure 24:
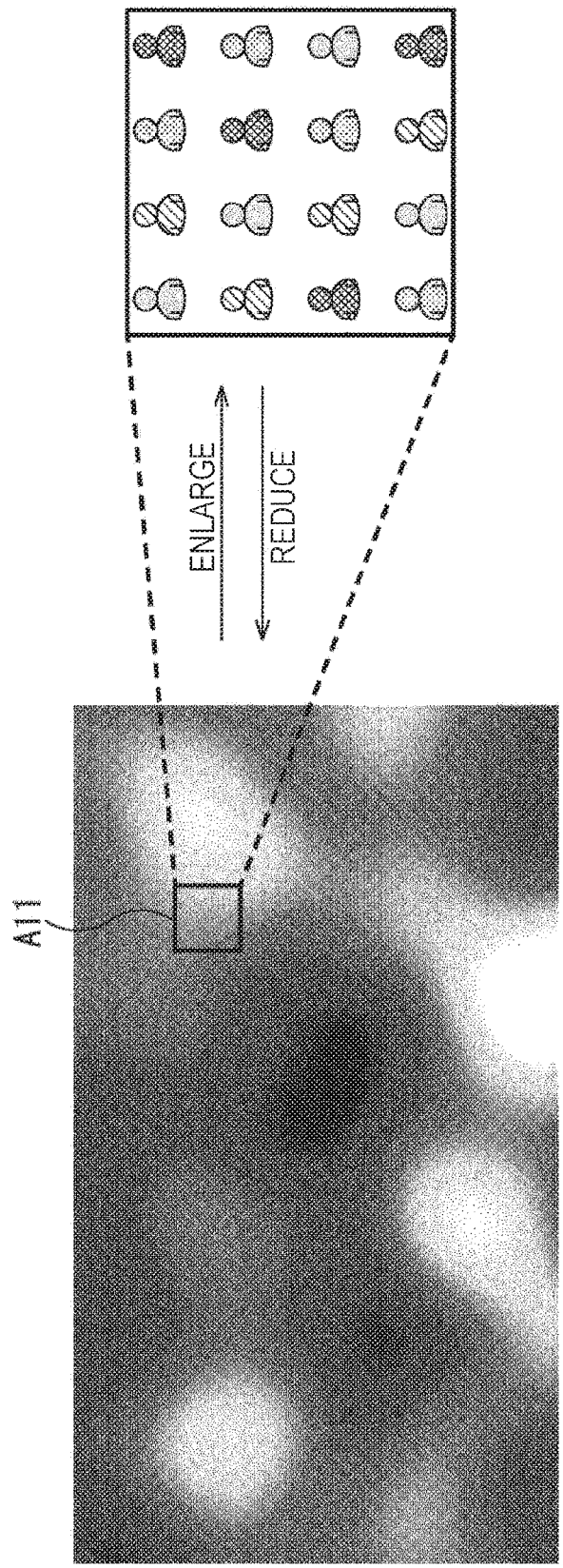
FIG. 24 is a diagram illustrating an example of switching of display of the heat map image.

FIG. 24 is a diagram illustrating an example of switching display of the heat map image.

The heat map image illustrated on a left side of FIG. 24 is an image identical to the heat map image described with reference to FIG. 7. For example, when the performers select a region A11 and designate enlargement of the degree of excitement, the display control apparatus 2 enlarges and displays the information indicating the degree of excitement of the users assigned to the region A11 as illustrated on a right side of FIG. 24.

The display control apparatus 2 displays, for example, human-shaped icons as information that visually indicates the degree of excitement of the users. The human-shaped icons are displayed in color according to the degree of excitement.

Thus, when the degree of excitement of the large number of spectators is displayed collectively, the region assigned to each spectator in the entire large display 3 becomes relatively small. Conversely, when the degree of excitement of the small number of spectators is displayed, the region assigned to each spectator becomes relatively large; at this time, the method for representing the degree of excitement can be changed. Thus, the information indicating the degree of excitement may be any information if the information can be checked visually.

By operating the portable terminals the performers have, the performers can select the region in which the degree of excitement is displayed, and can display enlarged information or reduced information indicating the degree of excitement.

<Variations>

The foregoing has described the examples in which the HMD is used as the client terminal; various devices having displays, such as a smartphone and a tablet terminal, can also be used as the client terminal.

During reproduction of the live content, the smartphone or tablet terminal as the client terminal detects the visual field of the user on the basis of the sensor data from an acceleration sensor or angular velocity sensor mounted thereon, and switches the display range of the video. Also, the smartphone or tablet terminal detects the motion of the user by analyzing an image of the user captured with a camera or on the basis of the sensor data, and then transmits the motion information to the aggregation server 12.

In addition, the smartphone or tablet terminal can also detect the motion of the user on the basis of various operations such as an operation of repeatedly rubbing a display surface and an operation of repeatedly pushing a button displayed on the display. The display of the smartphone or tablet terminal is provided with a stacked touch panel, enabling detection of the operation of the user applied to the display.

Example of Content

The foregoing has described a case where the video obtained by capturing a state of the concert is distributed as the live content; it is also possible to distribute a video obtained by capturing a state of a lecture.

In this case, during reproduction of the live content, for example, the HMDs 21 to 24 each detect whether the user as a student taking the lecture is dozing on the basis of the sensor data, and then transmit detected information as the motion information to the aggregation server 12 together with the user attribute information. The aggregation server 12 identifies the dozing user, generates a map image indicating of which attribute the user is sleeping, and then transmits the map image to the display control apparatus 2. The display control apparatus 2 causes the large display 3 to display the map image.

This allows a person as a teacher of the lecture to easily check of which attribute the user is sleeping.

Thus, the above-described technology can be applied to real time distribution of various moving pictures.

Also, in the foregoing, it is assumed that the content distributed is free visual point content; however, content of a normal moving picture with an unchangeable visual point or visual field may be distributed.

About Form of HMD

The description has been made on an assumption that the HMDs 21 to 24 are immersive HMDs; the above-described technology can be applied to so-called video see-through type HMDs and optical see-through type HMDs as well.

Figure 25A:
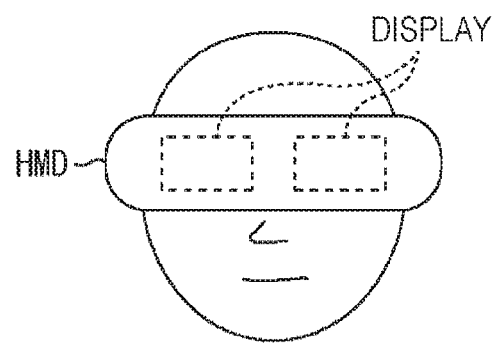
FIGS. 25A, 25B and 25C are diagram illustrating an example of a form of the HMD.
Figure 25B:
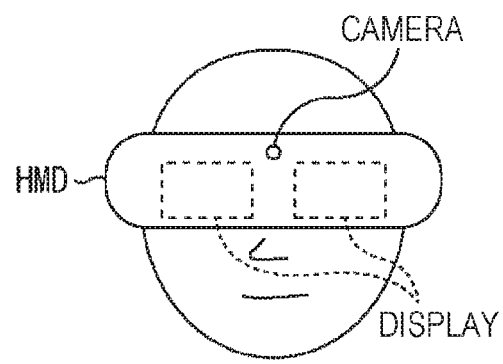
Figure 25C:
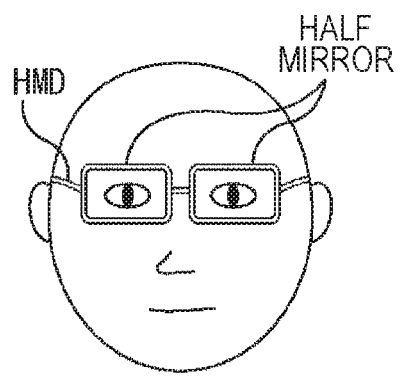

FIGS. 25A, 25B and 25C are diagrams illustrating an example of a form of the HMD.

As illustrated in FIG. 25B, the video see-through type HMD is identical to the immersive HMD in that the display is provided at a position where the video is projected in front of eyes of the user who wears a body. However, the video see-through type HMD is different from the immersive HMD in that a camera is provided in an enclosure of the HMD and a video of a scene ahead of the user captured with the camera is displayed on the display.

As illustrated in FIG. 25C, the optical see-through type HMD is an HMD with a half mirror provided in front of the eyes of the user who wears the HMD, which allows the user to see the scene ahead through the half mirror. Light of various types of information, such as the video of the live content, that is output from a light-emitting part provided in a section such as a frame section of the HMD is reflected by the half mirror and then guided to the eyes of the user. The user can see various types of information superimposed on the scene in front of the eyes.

About Program

A series of processing steps described above can be performed by hardware, and can be performed by software. When the series of processing steps is performed by software, a program that constitutes the software is installed in a computer built into dedicated hardware, a general-purpose personal computer, or the like.

The program to be installed is recorded and provided in the removable medium 111 illustrated in FIG. 11 including an optical disc (such as a compact disc-read only memory (CD-ROM) and a digital versatile disc (DVD)), a semiconductor memory, and the like. In addition, the program to be installed may be provided via a wired or wireless transmission medium, such as a local area network, the Internet, and digital broadcasting. The program can be installed in the ROM 102 or the recording unit 108 in advance.

It is to be noted that the program to be executed by the computer may be a program that performs processing on a time-series basis in order described in the present specification, or may be a program that performs processing in parallel or at necessary timing such as when called.

It is to be noted that in the present specification, the system means a set of a plurality of components (apparatus, module (part), and the like), and it does not matter whether all the components are inside the same enclosure. Therefore, a plurality of apparatuses which are contained in separate enclosures and connected via a network, and one apparatus with an enclosure that contains a plurality of modules are all systems.

The embodiment of the present technology is not limited to the above-described embodiment, and various changes can be made without departing from the spirit of the present technology.

For example, the present technology can have a configuration of cloud computing in which one function is divided among a plurality of apparatuses and is jointly processed via a network.

Also, each step described in the aforementioned flowcharts can be performed by one apparatus, and can also be performed by dividing the step among a plurality of apparatuses.

Furthermore, when one step includes a plurality of processing steps, the plurality of processing steps included in the one step can be performed by one apparatus, and can also be performed by dividing the processing steps among the plurality of apparatuses.

Effects described in the present specification are only illustrative and not restrictive, and other effects may be obtained.

<Example of Combination of Configurations>

The present technology can also have the following configurations.

(1)
An information processing apparatus including:
a receiving unit configured to receive motion information indicating a motion of a user who is watching video content and information indicating an attribute of the user transmitted from a reproducing apparatus that receives and reproduces the real time video content with a display range switched following the motion of the user who is a viewer within a range of a captured entire video;
a generation unit configured to generate an excitement image by arranging information that visually indicates a degree of excitement of each of the users determined on the basis of the motion information transmitted from the plurality of reproducing apparatuses at a position according to the attribute of each of the users; and
a transmitting unit configured to transmit data of the excitement image to a display control apparatus that causes a display apparatus installed in space where capturing of the video of the video content is performed to display the excitement image.

(2)
The information processing apparatus according to (1), wherein the generation unit generates the excitement image with a color according to the degree of excitement of the user arranged at the position according to the attribute of the user.

(3)
The information processing apparatus according to (1), wherein the generation unit generates the excitement image with an icon according to the degree of excitement of the user arranged at the position according to the attribute of the user.

(4)
The information processing apparatus according to any of (1) to (3), wherein the attribute of the user is at least one of a position of the user who is watching the video content, a favorite person of the user among a plurality of persons reflected in the video, and a visual field of the user corresponding to the display range.

(5)
The information processing apparatus according to any of (1) to (4), wherein
the receiving unit receives designation information transmitted from the display control apparatus, the designation information indicating a method for determining the degree of excitement based on the motion information and a method for arranging the information that visually indicates the degree of excitement, and
the generation unit generates the excitement image by determining the degree of excitement in accordance with the method for determination indicated by the designation information and by arranging the information that visually indicates the degree of excitement in accordance with the method indicated by the designation information.

(6)
The information processing apparatus according to (5), wherein the method for determining the degree of excitement and the method for arranging the information that visually indicates the degree of excitement are designated by a person reflected in the video.

(7)
An information processing method including the steps of:
receiving motion information indicating a motion of a user who is watching video content and information indicating an attribute of the user transmitted from a reproducing apparatus that receives and reproduces the real time video content with a display range switched following the motion of the user who is a viewer within a range of a captured entire video;
generating an excitement image by arranging information that visually indicates a degree of excitement of each of the users determined on the basis of the motion information transmitted from the plurality of reproducing apparatuses at a position according to the attribute of each of the users; and
transmitting data of the excitement image to a display control apparatus that causes a display apparatus installed in space where capturing of the video of the video content is performed to display the excitement image.

(8)
A program for causing a computer to perform processing including the steps of:
receiving motion information indicating a motion of a user who is watching video content and information indicating an attribute of the user transmitted from a reproducing apparatus that receives and reproduces the real time video content with a display range switched following the motion of the user who is a viewer within a range of a captured entire video;
generating an excitement image by arranging information that visually indicates a degree of excitement of each of the users determined on the basis of the motion information transmitted from the plurality of reproducing apparatuses at a position according to the attribute of each of the users; and
transmitting data of the excitement image to a display control apparatus that causes a display apparatus installed in space where capturing of the video of the video content is performed to display the excitement image.

(9)
A display control apparatus including:
a receiving unit configured to receive motion information indicating a motion of a user who is watching video content and information indicating an attribute of the user transmitted from a reproducing apparatus that receives and reproduces the real time video content with a display range switched following the motion of the user who is a viewer within a range of a captured entire video, and to receive data of an excitement image transmitted from an information processing apparatus that generates the excitement image by arranging information that visually indicates a degree of excitement of each of the users determined on the basis of the motion information transmitted from the plurality of reproducing apparatuses at a position according to the attribute of each of the users; and
a display control unit configured to cause a display apparatus installed in space where capturing of the video of the video content is performed to display the excitement image on the basis of the data of the excitement image.

(10)
The display control apparatus according to (9), wherein
the receiving unit receives designation information designated by a person reflected in the video, the designation information indicating a method for determining the degree of excitement based on the motion information and a method for arranging the information that visually indicates the degree of excitement, and
the display control apparatus further includes a transmitting unit configured to transmit the designation information to the information processing apparatus.

(11)
A display control method including the steps of:
receiving motion information indicating a motion of a user who is watching video content and information indicating an attribute of the user transmitted from a reproducing apparatus that receives and reproduces the real time video content with a display range switched following the motion of the user who is a viewer within a range of a captured entire video, and to receive data of an excitement image transmitted from an information processing apparatus that generates the excitement image by arranging information that visually indicates a degree of excitement of each of the users determined on the basis of the motion information transmitted from the plurality of reproducing apparatuses at a position according to the attribute of each of the users; and causing a display apparatus installed in space where capturing of the video of the video content is performed to display the excitement image on the basis of the data of the excitement image.

(12)

A program for causing a computer to perform processing including the steps of:

receiving motion information indicating a motion of a user who is watching video content and information indicating an attribute of the user transmitted from a reproducing apparatus that receives and reproduces the real time video content with a display range switched following the motion of the user who is a viewer within a range of a captured entire video, and to receive data of an excitement image transmitted from an information processing apparatus that generates the excitement image by arranging information that visually indicates a degree of excitement of each of the users determined on the basis of the motion information transmitted from the plurality of reproducing apparatuses at a position according to the attribute of each of the users; and causing a display apparatus installed in space where capturing of the video of the video content is performed to display the excitement image on the basis of the data of the excitement image.

(13)

A reproducing apparatus including:

a receiving unit configured to receive real time video content with a display range switched following a motion of a user who is a viewer within a range of a captured entire video;

a reproducing unit configured to reproduce the video content;

a detection unit configured to detect the motion of the user;

a display unit configured to display the video of the display range according to the motion of the user; and a transmitting unit configured to transmit motion information indicating the motion of the user who is watching the video content to an information processing apparatus that aggregates the motion information together with information indicating an attribute of the user.

(14)

The reproducing apparatus according to (13), wherein the motion detection unit detects a plurality of types of motion of the user.

(15)

A reproducing method including the steps of:

receiving real time video content with a display range switched following a motion of a user who is a viewer within a range of a captured entire video;

reproducing the video content;

detecting the motion of the user;

displaying the video of the display range according to the motion of the user; and transmitting motion information indicating the motion of the user who is watching the video content to an information processing apparatus that aggregates the motion information together with information indicating an attribute of the user.

(16)

A program for causing a computer to perform processing including the steps of:

receiving real time video content with a display range switched following a motion of a user who is a viewer within a range of a captured entire video;

reproducing the video content;

detecting the motion of the user;

displaying the video of the display range according to the motion of the user; and transmitting motion information indicating the motion of the user who is watching the video content to an information processing apparatus that aggregates the motion information together with information indicating an attribute of the user.

(17)

An information processing system including:

a reproducing apparatus including:

a receiving unit configured to receive real time video content with a display range switched following a motion of a user who is a viewer within a range of a captured entire video;

a reproducing unit configured to reproduce the video content;

a detection unit configured to detect the motion of the user;

a display unit configured to display the video of the display range according to the motion of the user; and a transmitting unit configured to transmit motion information indicating the motion of the user who is watching the video content to an information processing apparatus that aggregates the motion information together with information indicating an attribute of the user, the information processing apparatus including:

a receiving unit configured to receive the motion information and the information indicating the attribute of the user transmitted from the reproducing apparatuses;

a generation unit configured to generate an excitement image by arranging information that visually indicates a degree of excitement of each of the users determined on the basis of the motion information transmitted from the plurality of reproducing apparatuses at a position according to the attribute of each of the users; and a transmitting unit configured to transmit data of the excitement image to a display control apparatus that causes a display apparatus installed in space where capturing of the video of the video content is performed to display the excitement image, and the display control apparatus including:

a receiving unit configured to receive the data of the excitement image transmitted from the information processing apparatus; and a display control unit configured to cause the display apparatus installed in the space where the capturing of the video of the video content is performed to display the excitement image on the basis of the data of the excitement image.

REFERENCE SIGNS LIST

1 Capturing control apparatus
2 Display control apparatus
3 Large display
11 Distribution server
12 Aggregation server
21 to 24 HMD 121 Motion information receiving unit
122 Motion information recording unit
123 Excitement aggregation unit
124 Designation information receiving unit
125 Heat map image transmitting unit

The invention claimed is:
1. An information processing apparatus, comprising:
a receiving unit configured to receive, from each of a plurality of reproducing apparatuses, first motion information and attribute information, wherein
the first motion information indicates a motion of each user of a plurality of users,
the attribute information indicates an attribute of each user of the plurality of users,
the first motion information is different from the attribute information,
each of the plurality of reproducing apparatuses is associated with a respective user of the plurality of users, and
each of the plurality of reproducing apparatuses:
receives video content of a video corresponding to an event;
reproduces the video content; and
switches a display range of the video content within an entire range of the video based on the motion of the respective user;
a generation unit configured to:
determine a degree of excitement of each user of the plurality of users based on the first motion information;
determine color information based on the attribute of each user of the plurality of users, wherein the color information indicates the degree of excitement of the plurality of users; and
generate a heat map image associated with the event, wherein
the heat map image is generated based on the degree of excitement of each user of the plurality of users,
the heat map image includes an arrangement of the color information, and
the arrangement of the color information in the heat map image is based on a division of the color information; and
a transmitting unit configured to transmit the heat map image to a display control apparatus, wherein
the display control apparatus controls a display screen to display the heat map image, and
the display screen is in a space where the video is captured.
2. The information processing apparatus according to claim 1, wherein
the generation unit is further configured to generate the heat map image by the arrangement of the color information at a plurality of positions in the heat map image.
3. The information processing apparatus according to claim 1, wherein
the generation unit is further configured to generate the heat map image by arrangement of a plurality of icons, and
each of the plurality of icons indicates the degree of excitement of the respective user of the plurality of users.
4. The information processing apparatus according to claim 1, wherein the attribute of each user of the plurality of users is one of a position of the respective user of the plurality of users, a favorite person of the respective user among a plurality of persons reflected in the video, or a visual field, of the respective user, that corresponds to the display range.
5. The information processing apparatus according to claim 1, wherein
the receiving unit is further configured to:
receive second motion information from the plurality of reproducing apparatuses, wherein the second motion information indicates a plurality of motions of the plurality of users; and
receive designation information from the display control apparatus, wherein the designation information indicates:
a method to determine the degree of excitement of each of the plurality of users based on a specific motion, of the plurality of motions, of each of the plurality of users; and
a method to arrange the color information that indicates the degree of excitement, and
the generation unit is further configured to:
determine the degree of excitement based on the designation information; and
arrange the color information based on the designation information.
6. The information processing apparatus according to claim 5, wherein the designation information is associated with a person reflected in the video.
7. The information processing apparatus according to claim 1, wherein
the attribute of each user of the plurality of users corresponds to a favorite person among a plurality of persons,
the plurality of persons is associated with the video of the event, and
a determination of the favorite person is based on a visual field of the respective user.
8. An information processing method, comprising:
receiving, from each of a plurality of reproducing apparatuses, motion information and attribute information, wherein
the motion information indicates a motion of each user of a plurality of users,
the attribute information indicates an attribute of each user of the plurality of users,
the motion information is different from the attribute information,
each of the plurality of reproducing apparatuses is associated with a respective user of the plurality of users, and
each of the plurality of reproducing apparatuses:
receives video content of a video corresponding to an event;
reproduces the video content; and
switches a display range of the video content within an entire range of the video based on the motion of the respective user;
determining a degree of excitement of each user of the plurality of users based on the motion information;
determining color information based on the attribute of each user of the plurality of users, wherein the color information indicates the degree of excitement of the plurality of users;
generating a heat map image associated with the event, wherein
the heat map image is generated based on the degree of excitement of each user of the plurality of users, the heat map image includes an arrangement of the color information, and the arrangement of the color information in the heat map image is based on a division of the color information; and transmitting the heat map image to a display control apparatus, wherein the display control apparatus controls a display screen to display the heat map image, and the display screen is in a space where the video is captured.

9. A non-transitory computer-readable medium having stored thereon computer-readable instructions that, when executed by a processor, cause the processor to execute operations, the operations comprising:

receiving, from a plurality of reproducing apparatuses, motion information and attribute information, wherein the motion information indicates a motion of each user of a plurality of users, the attribute information indicates an attribute of each user of the plurality of users, the motion information is different from the attribute information, each of the plurality of reproducing apparatuses is associated with a respective user of the plurality of users, and each of the plurality of reproducing apparatuses:

receives video content of a video corresponding to an event;

reproduces the video content; and switches a display range of the video content within an entire range of the video based on the motion of the respective user;

determining a degree of excitement of each user of the plurality of users based on the motion information;

determining color information based on the attribute of each of the plurality of users, wherein the color information indicates the degree of excitement of the plurality of users;

generating a heat map image associated with the event, wherein the heat map image is generated based on the degree of excitement of each of the plurality of users, the heat map image includes an arrangement of the color information, and the arrangement of the color information in the heat map image is based on a division of the color information; and transmitting the heat map image to a display control apparatus, wherein the display control apparatus controls a display screen to display the heat map image, and the display screen is in a space where the video is captured.

10. A display control apparatus, comprising:

a receiving unit configured to:

receive, from each of a plurality of reproducing apparatuses, first motion information and attribute information, wherein the first motion information indicates a motion of each user of a plurality of users, the attribute information indicates an attribute of each user of the plurality of users, the first motion information is different from the attribute information, each of the plurality of reproducing apparatuses is associated with a respective user of the plurality of users, and each of the plurality of reproducing apparatuses:

receives video content of a video corresponding to an event;

reproduces the video content; and switches a display range of the video content within an entire range of the video based on the motion of the respective user; and receive a heat map image from an information processing apparatus, wherein the information processing apparatus:

determines a degree of excitement of each user of the plurality of users based on the first motion information;

determines color information based on the attribute of each of the plurality of users, wherein the color information indicates the degree of excitement of the plurality of users; and generates the heat map image associated with the event, wherein the heat map image is generated based on the degree of excitement of each of the plurality of users, the heat map image includes an arrangement of the color information, and the arrangement of the color information on the heat map image is based on a division of the color information; and a display control unit configured to control a display screen to display the heat map image, wherein the display screen is in a space where the video is captured.

11. The display control apparatus according to claim 10, further comprising a transmitting unit, wherein the receiving unit is further configured to:

receive second motion information from the plurality of reproducing apparatuses, wherein the second motion information indicates a plurality of motions of the plurality of users;

receive designation information associated with a person reflected in the video, wherein the designation information indicates:

a method to determine the degree of excitement based on a specific motion of the plurality of motions; and a method to arrange the color information that indicates the degree of excitement, and the transmitting unit is configured to transmit the designation information to the information processing apparatus.

12. A display control method, comprising:

receiving, from each of a plurality of reproducing apparatuses, motion information and attribute information, wherein the motion information indicates a motion of each user of a plurality of users, the attribute information indicates an attribute of each user of the plurality of users, the motion information is different from the attribute information, each of the plurality of reproducing apparatuses is associated with a respective user of the plurality of users, and each of the plurality of reproducing apparatuses:

receives video content of a video corresponding to an event;

reproduces the video content; and
switches a display range of the video content within an entire range of the video based on the motion of the respective user;
receiving a heat map image from an information processing apparatus, wherein the information processing apparatus:
determines a degree of excitement of each user of the plurality of users based on the motion information;
determines color information based on the attribute of each of the plurality of users, wherein the color information indicates the degree of excitement of the plurality of users; and
generates the heat map image associated with the event, wherein
the heat map image is generated based on the degree of excitement of each user of the plurality of users,
the heat map image includes an arrangement of the color information, and
the arrangement of the color information in the heat map image is based on a division of the color information; and
controlling a display screen to display the heat map image, wherein the display screen is in a space where the video is captured.

13. A non-transitory computer-readable medium having stored thereon computer-readable instructions that, when executed by a processor, cause the processor to execute operations, the operations comprising:
receiving, from each of a plurality of reproducing apparatuses, motion information and attribute information, wherein
the motion information indicates a motion of each user of a plurality of users,
the attribute information indicates an attribute of each user of the plurality of users,
the motion information is different from the attribute information,
each of the plurality of reproducing apparatuses is associated with a respective user of the plurality of users, and
each of the plurality of reproducing apparatuses:
receives video content of a video corresponding to an event;
reproduces the video content; and
switches a display range of the video content within an entire range of the video based on the motion of the respective user;
receiving a heat map image from an information processing apparatus, wherein the information processing apparatus:
determines a degree of excitement of each user of the plurality of users based on the motion information;
determines color information based on the attribute of each of the plurality of users, wherein the color information indicates the degree of excitement of the plurality of users; and
generates the heat map image associated with the event, wherein
the heat map image is generated based on the degree of excitement of each of the plurality of users,
the heat map image includes an arrangement of the color information, and
the arrangement of the color information in the heat map image is based on a division of the color information; and
controlling a display screen to display the heat map image, wherein the display screen is in a space where the video is captured.

14. A reproducing apparatus, comprising:
a receiving unit configured to receive video content of a video, corresponding to an event, with a display range switched within an entire range of the video, wherein the switch of the display range is based on a first user motion;
a reproducing unit configured to reproduce the video content;
a detection unit configured to detect the first user motion;
a display unit configured to display the video content of the display range based on the first user motion; and
a transmitting unit configured to transmit first motion information to an information processing apparatus, wherein
the first motion information indicates the first user motion, and
the information processing apparatus:
receives second motion information from a specific apparatus, wherein the second motion information indicates a second user motion;
aggregates the first motion information, the second motion information, and attribute information indicating each of a first user attribute and a second user attribute,
wherein each of the first motion information and the second motion information is different from the attribute information;
determines a first user degree of excitement based on the first motion information; and
determines a second user degree of excitement based on the second motion information;
determines color information based on the first user attribute and the second user attribute, wherein the color information indicates each of the first user degree of excitement and the second user degree of excitement; and
generates a heat map image associated with the event, wherein
the heat map image is generated based on each of the first user degree of excitement and the second user degree of excitement,
the heat map image includes an arrangement of the color information, and
the arrangement of the color information in the heat map image is based on a division of the color information.

15. The reproducing apparatus according to claim 14, wherein the detection unit is further configured to detect a plurality of types of the first user motion.

16. A reproducing method, comprising:
receiving video content of a video, corresponding to an event, with a display range switched within an entire range of the video, wherein the switch of the display range is based on a first user motion;
reproducing the video content;
detecting the first user motion;
displaying the video content of the display range based on the first user motion; and
transmitting first motion information to an information processing apparatus, wherein
the first motion information indicates the first user motion, and the information processing apparatus:
receives second motion information from a specific apparatus, wherein the second motion information indicates a second user motion;
aggregates the first motion information, the second motion information, and attribute information that indicates a first user attribute and a second user attribute,
wherein each of the first motion information and the second motion information is different from the attribute information;
determines a first user degree of excitement based on the first motion information; and
determines a second user degree of excitement based on the second motion information;
determines color information based on the first user attribute and the second user attribute, wherein the color information indicates each of the first user degree of excitement and the second user degree of excitement; and
generates a heat map image associated with the event, wherein
the heat map image is generated based on each of the first user degree of excitement and the second user degree of excitement,
the heat map image includes an arrangement of the color information, and
the arrangement of the color information in the heat map image is based on a division of the color information.

17. A non-transitory computer-readable medium having stored thereon computer-readable instructions that, when executed by a processor, cause the processor to execute operations, the operations comprising:
receiving video content of a video, corresponding to an event, with a display range switched within an entire range of the video, wherein the switch of the display range is based on a first user motion;
reproducing the video content;
detecting the first user motion;
displaying the video content of the display range based on the first user motion; and
transmitting first motion information to an information processing apparatus, wherein
the first motion information indicates the first user motion, and
the information processing apparatus:
receives second motion information from a specific apparatus, wherein the second motion information indicates a second user motion;
aggregates the first motion information, the second motion information, and attribute information indicating each of a first user attribute and a second user attribute,
wherein each of the first motion information and the second motion information is different from the attribute information;
determines a first user degree of excitement based on the first motion information; and
determines a second user degree of excitement based on the second motion information;
determines color information based on the first user attribute and the second user attribute, wherein the color information indicates each of the first user degree of excitement and the second user degree of excitement; and
generates a heat map image associated with the event, wherein
the heat map image is generated based on each of the first user degree of excitement and the second user degree of excitement,
the heat map image includes an arrangement of the color information, and
arrangement of the color information in the heat map image is based on a division of the color information.

18. An information processing system, comprising:
a plurality of reproducing apparatuses, wherein
each of the plurality of reproducing apparatuses is associated with a respective user of a plurality of users, and
each of the plurality of reproducing apparatuses comprising:
a first receiving unit configured to receive video content of a video, corresponding to an event, with a display range switched within an entire range of the video, wherein the switch of the display range is based on a motion of the respective user;
a reproducing unit configured to reproduce the video content;
a detection unit configured to detect the motion of the respective user;
a display unit configured to display the video content of the display range based on the motion of the respective user; and
a first transmitting unit configured to transmit motion information to an information processing apparatus, wherein
the motion information indicates the motion of each user of the plurality of users,
the information processing apparatus aggregates the motion information with attribute information,
the attribute information indicates an attribute of each user of the plurality of users, and
the attribute information is different from the motion information;
the information processing apparatus comprising:
a second receiving unit configured to receive the motion information and the attribute information from each of the plurality of reproducing apparatuses;
a generation unit configured to:
determine a degree of excitement of each user of the plurality of users based on the motion information;
determine color information based on the attribute of each user of the plurality of users, wherein the color information indicates the degree of excitement of the plurality of users; and
generate a heat map image associated with the event, wherein
the heat map image is generated based on the degree of excitement of each user of the plurality of users,
the heat map image includes an arrangement of the color information, and
the arrangement of the color information in the heat map image is based on a division of the color information; and
a second transmitting unit configured to transmit the heat map image to a display control apparatus; and the display control apparatus comprising:
a third receiving unit configured to receive the heat map image from the information processing apparatus; and
a display control unit configured to control a display screen to display the heat map image, wherein the display screen is in a space where the video is captured.

* * * * *